US008332317B1

(12) United States Patent
McCoy et al.

(10) Patent No.: US 8,332,317 B1
(45) Date of Patent: Dec. 11, 2012

(54) VERIFICATION OF A FINANCIAL INSTRUMENT ALLOWING RULES-BASED PRE-ACCEPTANCE USE OF THE FINANCIAL INSTRUMENT

(75) Inventors: Randal A. McCoy, Suwanee, GA (US); James G. Magers, Atlanta, GA (US)

(73) Assignee: Checkfree Corporation, Norcross, GA (US)

( * ) Notice: Subject to any disclaimer, the term of this patent is extended or adjusted under 35 U.S.C. 154(b) by 1954 days.

(21) Appl. No.: 10/284,448

(22) Filed: Oct. 31, 2002

(51) Int. Cl.
*G06Q 40/00* (2006.01)

(52) U.S. Cl. .......................................... 705/40; 705/39

(58) Field of Classification Search ................ 705/36, 705/43, 44, 39, 40
See application file for complete search history.

(56) References Cited

U.S. PATENT DOCUMENTS

| | | | |
|---|---|---|---|
| 4,823,264 A | 4/1989 | Deming | |
| 5,025,373 A | 6/1991 | Keyser, Jr. et al. | |
| 5,220,501 A | 6/1993 | Lawlor et al. | |
| 5,283,829 A | 2/1994 | Anderson | |
| 5,326,959 A | 7/1994 | Perazza | |
| 5,336,870 A | 8/1994 | Hughes et al. | |
| 5,383,113 A | 1/1995 | Kight et al. | 364/401 |
| 5,420,405 A | 5/1995 | Chasek | |
| 5,465,206 A | 11/1995 | Hilt et al. | |
| 5,484,988 A | 1/1996 | Hills et al. | 235/349 |
| 5,504,677 A | 4/1996 | Pollin | 364/408 |
| 5,659,165 A * | 8/1997 | Jennings et al. | 235/379 |
| 5,677,955 A * | 10/1997 | Doggett et al. | 705/76 |
| 5,699,528 A | 12/1997 | Hogan | |
| 5,710,889 A | 1/1998 | Clark et al. | |
| 5,727,249 A | 3/1998 | Pollin | 705/40 |
| 5,794,221 A | 8/1998 | Egendorf | |
| 5,873,072 A | 2/1999 | Kight et al. | |
| 5,878,141 A * | 3/1999 | Daly et al. | 705/78 |
| 5,884,288 A | 3/1999 | Chang et al. | |
| 5,920,847 A | 7/1999 | Kolling et al. | |
| 5,920,848 A | 7/1999 | Schutzer et al. | |
| 5,966,698 A | 10/1999 | Pollin | 705/34 |
| 5,974,146 A | 10/1999 | Randle et al. | |
| 5,978,780 A | 11/1999 | Watson | |
| 6,029,150 A | 2/2000 | Kravitz | |
| 6,032,133 A | 2/2000 | Hilt et al. | |

(Continued)

OTHER PUBLICATIONS

Does Recognition versus Disclosure Matter? Evidence from Value-Relevance of Banks' Recognized and Disclosed Derivative Financial Instruments The Accounting Review, vol. 81, No. 3 (May 2006), pp. 567-588.*

(Continued)

*Primary Examiner* — Hani M Kazimi
*Assistant Examiner* — Chuks Onyezia
(74) *Attorney, Agent, or Firm* — Sutherland Asbill & Brennan LLP

(57) ABSTRACT

A method of verifying authority of a customer to use a financial instrument, includes initiating one or more transactions using a financial instrument identified by a customer. One or more attributes of the initiated one or more transactions are stored. A determination is made as to whether or not a further financial transaction using the identified financial instrument, requested by the customer prior to acceptance of the use of the financial instrument, complies with pre-acceptance transaction rules. The further transaction is initiated only if it is determined to comply with the pre-acceptance transaction rules. One or more proffered attributes are received, typically from the customer. The received proffered attributes are compared to the stored attributes. Use of the financial instrument by the customer is then accepted if the received proffered attributes correspond to the stored attributes.

25 Claims, 23 Drawing Sheets

U.S. PATENT DOCUMENTS

| | | | |
|---|---|---|---|
| 6,041,315 | A | 3/2000 | Pollin ............................... 705/45 |
| 6,098,053 | A | 8/2000 | Slater |
| 6,164,528 | A | 12/2000 | Hills et al. .................... 235/379 |
| 6,188,994 | B1 | 2/2001 | Egendorf |
| 6,311,170 | B1 | 10/2001 | Embrey |
| 2001/0037295 | A1 | 11/2001 | Olsen |
| 2002/0004772 | A1 | 1/2002 | Templeton et al. ............. 705/35 |

OTHER PUBLICATIONS

Journal of Economic Crime Management Summer 2002, vol. 1, Issue 1 Customer Authentication: The Evolution of Signature Verification in Financial Institutions Edward J. Potter, President, PSI Fraud Solutions.*

Two Agency-Cost Explanations of Dividends Frank H. Easterbrook The American Economic Review, vol. 74, No. 4 (Sep. 1984), pp. 650-659 Published by: American Economic Association.*

5,351,994, Oct. 4, 1994, Pollin (withdrawn).

Disclosure under 37 C.F.R. 1.56, Date: Dec. 17, 2007.

Final Office Action dated Mar. 20, 2008 for related U.S. Appl. No. 10/284,462.

* cited by examiner

VERIFICATION OF A FINANCIAL INSTRUMENT ALLOWING RULES-BASED PRE-ACCEPTANCE USE OF THE FINANCIAL INSTRUMENT

RELATED APPLICATIONS

This application is related to U.S. patent application Ser. No. 10/284,462, filed Oct. 31, 2002 and entitled "System and Method for Verifying a Financial Instrument"; U.S. patent application Ser. No. 10/284,449, filed Oct. 31, 2002 and entitled Verifying a Financial Instrument Using a Customer Requested Transaction"; and U.S. patent application Ser. No. 12/284,443, filed Oct. 31, 2002, entitled "Verification of a Financial Instrument Using a Random Number of Transactions".

FIELD OF THE INVENTION

The present invention relates to electronic commerce and more particularly to confirmation or validation of associations between accounts or other financial instruments and customers, such as electronic commerce subscribers.

BACKGROUND OF THE INVENTION

With the proliferation of computers has come a proliferation of uses for those computers. These include a myriad of electronic commerce services as well as a myriad of electronic commerce service providers. One electronic commerce service is the service of making payments and other financial transactions on behalf of computer users by an electronic commerce service provider.

For example, CheckFree, the assignee of the present application and a pioneer in the electronic commerce services field, provides, among its electronic commerce service offerings, customer-initiated electronic bill payment, automatic electronic bill payment of received electronic bills, person-to-person electronic payment, also known as e-mail payment, payment-on-delivery electronic payment, as well as electronic account transfer services, to computer users, known as subscribers. In providing each of these services, CheckFree accesses an account associated with a subscriber to obtain funds. These accounts typically are demand deposit accounts (DDAs) such as checking accounts maintained at financial institutions not associated with CheckFree, though other types of accounts maintained at financial institutions are also utilized.

To provide electronic commerce services in which a service provider accesses a subscriber's account, the subscriber must enroll with the service provider. The enrollment process conventionally includes the subscriber providing account information to the service provider via a paper form. This also often includes the subscriber providing a voided check when the subscriber's account is a checking account.

A service provider in turn often performs various checks to determine if an account identified by an enrolling subscriber is an existing account, as a measure of fraud prevention. For CheckFree, this includes determining if the routing and transit number (RTN) of the subscriber's account is valid. Also, CheckFree verifies that the pattern (scheme) of the account number is appropriate for the RTN. Additionally, CheckFree also often confirms if an account can be reached electronically. In the past this has included issuing a pre-note to the account. A pre-note is an electronic transaction via the ACH network directed to a subscriber's DDA in which funds are not transferred. If the ACH network does not send back the pre-note (for such reason as because the subscriber's account is not located/not reachable electronically), CheckFree knows that the account exists and can be reached electronically. More recently, CheckFree has begun utilizing proprietary databases including information indicating financial institutes which can be reached electronically.

This processing is inefficient, as a paper form and check must be delivered to a service provider, which are in turn processed. All electronic enrollment processing has been proposed to alleviate the delay in enrollment, as well much of the costs of paper-enrollment. In the proposed all-electronic enrollment a subscriber provides account information electronically, typically on-line, to a service provider, who in turn validates the account's existence, or at least validates that the provided account information meets certain criteria (i.e., that a routing and transit number is valid, and that an account number is valid, and that an account number pattern is valid for that routing and transit number). One all-electronic enrollment technique is disclosed in U.S. patent application Ser. No. 09/820,803, which is assigned to the assignee of the present application.

Typically, in both paper and all-electronic enrollment processing, a service provider does not actually confirm that the account is associated with the subscriber. Upon successful completion of the pre-note process, or upon completion of the alternative database processing, all the service provider knows is that the account exists and is reachable electronically. Thus, the service provider is still in a position of risk because the service provider has not actually confirmed that the account is associated with, i.e., belongs to, the subscriber.

To overcome this risk it has been proposed to use commercially available databases containing information concerning account existence, standing, and association with subscribers. Use of these databases is costly to the service provider. Furthermore, their usefulness is limited to accounts/subscribers included in the databases.

A more recently imposed technique to overcome this risk includes the service provider making one or more transactions using a subscriber's account, typically via the ACH network, upon receipt of information identifying the account during enrollment. One or more selected details which vary from transaction to transaction, including the number of transactions performed, the amount of a transaction, the type of transaction (e.g. credit, debit, deposit and/or withdrawal), the merchant name or account used for the transaction, are stored by the service provider. The subscriber determines these same details [then], based upon a bank statement or banking information available in person, on-line, or via telephone from the financial institution maintaining the account. The subscriber then informs the service provider of the determined details. If the subscriber correctly confirms the detail(s), the service provider can have a high level of confidence that the account is actually associated with the subscriber. Upon successful confirmation of the correct detail(s), the service provider completes the subscriber's enrollment, enabling the subscriber to utilize the service(s) of the service provider.

This recently proposed technique, however, has several drawbacks. One drawback is that the subscriber cannot avail himself or herself of the electronic commerce services offered by the service provider until that subscriber correctly determines and informs the service provider of the selected detail(s). Thus, while risk to the service provider is reduced, there is still a delay in the subscriber being able to use the service, or services, offered by the service provider.

Another drawback of the proposed technique is that the technique contemplates a net credit to the subscriber's account, from funds of the service provider. Although the transactions are proposed to be of small amounts, when considering the use of the proposed technique for millions and millions of subscribers, and perhaps multiple accounts per subscriber, the cost of the technique can be quite high. Hence, if the net amount for multiple transactions to a single subscribers account is a $1.00 US credit, and if 100 million accounts were to be verified, the cost would be on the order of $100 million. Even if the net credit is $0.10 US, the cost would be on the order of $10 million, which is not insignificant.

Still another drawback of the proposed technique is the quality of the verification itself. As proposed, verification is based on details of individual transactions, including the amount of the transaction, the type of transaction (e.g. credit, debit, deposit or withdrawal), the merchant name or account number used for the transaction in conjunction with the subscriber designated account, or the number of the last of a series of transactions, which will also represent the total number of transactions performed. The probability of a fraudulent subscriber guessing one or more of these details could be quite high unless the implementation included a burdensome number of transactions or details which are difficult for a subscriber to remember and thus proffer back to the service provider.

For example, if one of only a small set of option, e.g. 1 to 5 transactions, were routinely performed, there is a very high probability that a fraudulent subscriber could guess this detail. The quality of the verification using the proposed technique will increase, and may even be satisfactory, if implemented such that the number of options to choose from is relatively large in comparison to the number of retry attempts allowed, and there is variability from one verification to the next verification. However, such implementations make the process difficult for subscribers and hence impractical from a business perspective.

Accordingly, a need exists for a technique to verify an association between a subscriber and an account without the above noted deficiencies. It would also be beneficial if a subscriber designated account could be verified in a manner that was less burdensome or even beneficial to the subscriber.

OBJECTS OF THE INVENTION

It is an object of the present invention to provide an improved technique to validate an association between an account and an account holder.

It is another object of aspects of the present invention to provide a technique for validating an association between an account and a service subscriber which reduces risk and/or cost to a service provider.

It is yet another object of other aspects of the present invention to provide a more subscriber friendly technique for validating an association between an account and a service subscriber.

Additional objects, advantages, novel features of the present invention will become apparent to those skilled in the art from this disclosure, including the following detailed description, as well as by practice of the invention. While the invention is described below with reference to preferred embodiment(s), it should be understood that the invention is not limited thereto. Those of ordinary skill in the art having access to the teachings herein will recognize additional implementations, modifications, and embodiments, as well as other fields of use, which are within the scope of the invention as disclosed and claimed herein and with respect to which the invention could be of significant utility.

SUMMARY OF THE INVENTION

In accordance with the present invention, a system is provided for verifying the authority of a customer to use a financial instrument. The financial instrument could, for example, be a credit card, debit card, deposit account or a credit account maintained at a financial institute, such as a bank, brokerage firm, or credit/debit card issuer.

The system includes one or more processors. The processor(s) could be a mainframe, high powered workstation or some other type of processing device(s). The processor(s) are configured, i.e. programmed, to initiate one or more transactions, typically one or more debits and/or credits, using a financial instrument identified by a customer. The verifying entity could, for example, be an electronic payment service provider. In such a case, the verifying entity would be the entity that controls and operates the processor(s).

Each of the one or more initiated transactions will respectively have one or more attributes, which are sometime referred to as transaction details. Attributes of a typical transaction may include the amount of the transaction, the type of transaction, e.g. debit, credit, deposit or withdrawal, the name of another entity, e.g. a merchant or the verifying entity, from whose account funds are credited to the financial instrument or to whose account funds debited from the financial instrument are transferred, the account number of such an entity, and/or the number of a particular transaction in a series of transaction, the number of the last transaction representing the total number of transactions in the series.

The initiation of the transactions will commonly require the transmission of one or more instructions for the financial institute to perform the desired transaction(s). For example, if the initiated transaction is a debit to the financial instrument, the transmitted instruction will typically direct the financial institute maintaining the financial instrument identified by the customer to debit the financial instrument and transfer the debited funds to another financial instrument. On the other hand, if the initiated transaction is a credit to the financial instrument, the transmitted instruction will typically direct the financial institute to credit funds to the financial instrument that have been transferred from another financial instrument. One or more storage devices are provided and configured to store one or more attributes of the initiated one or more transactions, and preferably also pre-acceptance transaction rules.

Prior to the use of the financial instrument by the customer being accepted, the processor(s) are further configured to determine if another transaction using the identified financial instrument, typically one requested by the customer, complies with the stored pre-acceptance transaction rules. The processor(s) will initiate this other transaction only if it is determined comply with the stored pre-acceptance transaction rules.

The pre-acceptance transaction rules may, for example, include a pre-acceptance date and/or a pre-acceptance amount. The requested other transaction will also typically include a transaction date and/or a transaction amount. If so, the requested transaction will be deemed to comply with pre-acceptance transaction rules only if transaction date is earlier than the pre-acceptance date and/or one or more of (i) the transaction amount, (ii) a sum of the transaction amount and other transaction amounts associated with additional other transactions initiated prior to acceptance of the financial instrument, and (iii) the total number of the other transactions and the additional other transactions, does not exceed the pre-acceptance amount.

If the stored pre-acceptance transaction rules include a pre-acceptance amount, and the initiated other transaction includes a transaction amount, the processor(s) may beneficially be further configured to determine a difference between the transaction amount and the pre-acceptance amount, and to direct a transmission, to the customer, of this difference. Thus, the customer can be notified of the remaining amount that may be debited from the customer identified financial instrument, prior to acceptance of the use of the financial instrument. Hence, the customer is made aware of the remaining amount available for requesting still another transaction to, for example, pay a customer's bill through a service provider or for some other purpose.

The storage device may be further configured to store a plurality of different pre-acceptance transaction rules. If so, the processor(s) can be further configured to select the particular pre-acceptance transaction rules that will be applied to a customer from the stored plurality of different pre-acceptance transaction rules. The pre-acceptance transaction rules may, for example, be selected based on the customer and/or a sponsor of the customer. In this regard, the processor(s) may select different rules based on the attributes or characteristics of the customer, e.g. the customer's credit rating, and/or a relationship which a verifying entity, such as an electronic payment service provider, has with a sponsor of the customer, such as the financial institute which maintains the financial instrument identified by the customer or some other sponsoring entity.

The processor(s) are also configured to receive one or more proffered attributes, typically from the customer, and to compare the received proffered attributes to the stored attributes. The processor(s) will deem the use of the financial instrument by the customer acceptable if the received proffered attributes correspond to, e.g. match, the stored attributes.

To proffer the attributes, the customer will need to determine what transactions have been previously performed. This can be accomplished by reviewing a statement from the financial institute, which indicates the transactions that have been performed using the identified financial instrument, for example at the verifying entity's request. The statement may be provided to the customer in any of various forms. For example, the statement may be a hard, e.g. paper, copy monthly statement issued by the financial institute, or a statement accessible, via the Internet, at a Web site associated with the financial institute, or by telephone communications with the financial institute, or in some other way. The customer then proffers the one or more attributes based on the transactions which are determined to have been performed.

According to an aspect of the invention, the initiated one or more initial transactions may result in a first net monetary amount being credited to the financial instrument, a second net monetary amount being debited from, or no change in the balance of the financial instrument. That is, the transactions may result in either a net credit or debit to, or zero change in the balance of, the financial instrument identified by the customer. In the case of a net debit or credit, another transaction using the financial instrument may be initiated, typically by the verifying entity, to either completely or partially balance the financial instrument. For example, the first net monetary amount may be debited from the financial instrument, if the initiated one or more transactions resulted in the first net monetary amount being credited to the financial instrument. Alternatively, the second net monetary amount may be credited to the financial instrument, if the initiated one or more transactions resulted in the second net monetary amount being debited from the financial instrument. Thus, the transaction costs of the verification can be reduced, if not eliminated altogether.

In accordance with another aspect of the invention, the one or more processors are further configured to direct one or more transmissions, to the customer, of one or more pull down menus including the financial instrument. The transmission(s) may be directed before and/or after use of the financial instrument by the customer has been determined to be acceptable.

For example, the processor(s) may be further configured to direct a transmission, to the customer, of a first pull down menu including the financial instrument, after the financial instrument has been identified by the customer but before use of the financial instrument by the customer has been found acceptable. After use of the financial instrument by the customer has been accepted, the processor(s) may direct transmission of a second pull down menu to the customer, which also includes the financial instrument but which is different than the first pull down menu. The customer may select the financial instrument from either menu to request a further transaction using the identified financial instrument.

However, in many, if not most implementations, it will be desirable for the processor(s) to be further configured to initiate other transactions to credit the financial instrument only after use of the financial instrument by the customer has been accepted, and therefore only based on selection of the financial instrument from the second pull down menu. This will limit any transactions initiated before the use of the financial instrument has been accepted, and therefore any transactions based on the selection of the financial instrument from the first pull down menu, to debit transactions. These limitations on the purposes for which the financial instrument may be selected from the first menu may be implemented within the pre-acceptance rules.

In a networked system implementation, at least one first network, e.g. the Internet and/or the public switch telephone network, and a second network, e.g. the ACH, ATM or credit/debit card network, are utilized to verify the customer identified financial instrument. A customer station, which might take the form of a personal computer, a telephone or some other type of communication device, transmits, via the at least one first network, a first message identifying a financial instrument.

A verifier station, which could include one or more processing and/or storage devices, transmits, via the second network, a second message identifying one or more transactions using the financial instrument identified in the transmitted first message. It will be recognized that the second message could be transmitted as multiple messages if so desired. As discussed above, each of the one or more transactions will respectively have one or more attributes. A financial institute station performs the transaction(s) identified in the transmitted second message.

The customer station also transmits, via the at least one first network and prior to use of the financial instrument being determined to be acceptable, a third message identifying a further transaction using the financial instrument identified in the transmitted first message. The verifier station determines if this further transaction complies with pre-acceptance transaction rules. If so, the verifier station transmits, via the second network, a fourth message identifying the further transaction. The financial institute station performs the further transaction identified in the fourth message transmitted by the verifier station.

The pre-acceptance transaction rules will advantageously include the pre-acceptance amount and the further transaction will typically include a transaction amount. If the transaction amount is less than the pre-acceptance amount, the verifier station can be configured to transmit, via the at least one first network, a message representing a difference between the transaction amount and the pre-acceptance amount. The customer station can then display the difference in the amounts represented in this latter transmitted message.

To obtain acceptance of the financial instrument. the customer station must also transmit, via the at least one first network, a fifth message identifying one or more proffered attributes. The verifier station compares the proffered attributes identified in the fifth message to the one or more attributes of the initiated/performed transactions, and determines that use of the financial instrument is acceptable if the compared attributes correspond. The verifier station preferably transmits, via the at least one first network, a sixth message indicating the acceptance of the use of the financial instrument by the customer.

According to other aspects of the invention, the verifier station may beneficially transmit, via the at least one first network, one or more other messages representing one or more pull down menus including the financial instrument, before and/or after acceptance of the use of the financial instrument by the customer. If so, the customer station will typically display the menu(s) to the customer.

For example, the verifier station may be configured to transmit a message representing a first pull down menu including the financial instrument, after transmission of the first message but before use of the financial instrument is determined to be acceptable, and another message after use of the financial instrument is determined to be acceptable, which represents a second pull down menu and also includes the financial instrument, but which is different than the first pull down menu. The customer station can display the first and second pull down menus. Preferably, the customer station is further configured to transmit, via the at least one first network, yet another message. This other message may represent an indication of the selection of the financial instrument in the displayed first pull down menu for a financial transaction debiting the financial instrument, or of the financial instrument in the displayed second pull down menu for a financial transaction either crediting or debiting the financial instrument. Here again, the limitation of the selection of the financial instrument from the displayed first menu for debiting, can be implemented within the pre-acceptance transaction rules.

It will also be understood by those skilled in the art that the invention is easily implemented using computer software. More particularly, software can be easily programmed, using routine programming skill, based upon the description of the invention set forth herein and stored on a storage medium which is readable by a computer processor of the applicable component, e.g. service provider network server or subscriber computer, to cause the processor to operate such that the particular component performs in the manner described above.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

FIG. 3B is an exemplary screen shot of an Add Payment Account page in accordance with the second embodiment of the present invention.

FIG. 4B is an exemplary screen shot of a Payment Account Confirmation page in accordance with the second embodiment of the present invention.

FIG. 5A is an exemplary screen shot of a Payment Account Confirmation page for display when incorrect information has been provided in accordance with the first embodiment of the present invention.

FIG. 7 is an exemplary screen shot of an alternative Payment Account Confirmation page suitable for printing in accordance with the first and second embodiments of the present invention.

FIG. 9 is an exemplary screen shot of an optional Payment Account Information page in accordance with the first embodiment and the second embodiment of the present invention.

FIG. 10 is a flow chart depicting payment processing in accordance with the first embodiment and the second embodiment of the present invention.

FIG. 16 is a flow chart depicting account confirmation processing in accordance with a third embodiment of the present invention.

FIG. 17 is an exemplary screen shot of a Confirmation Payment page in accordance with the third embodiment of the present invention.

DETAILED DESCRIPTION OF PREFERRED EMBODIMENT(S)

Network Entities

Figure 1A:
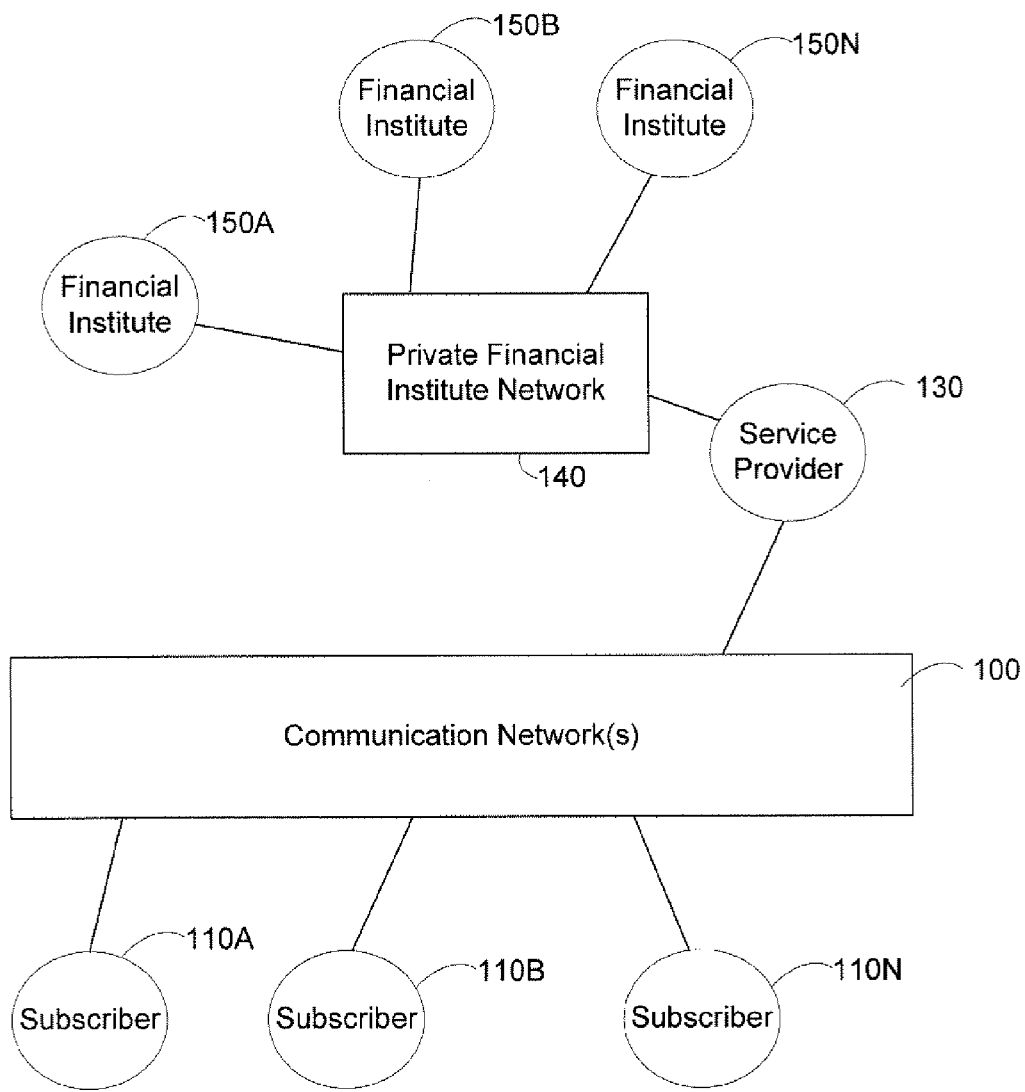
FIG. 1A is a simplified depiction of a service provider in communication with multiple subscribers and multiple financial institutes in accordance with the present invention.

As shown in FIG. 1A, network(s) 100 interconnects multiple subscribers 110A-110N and a service provider 130. It should be understood that the service provider 130 could be any entity providing any type of electronic commerce service. The communication network(s) 100 could be of virtually any type, and preferably includes the Internet. Network(s) 100 could also be multiple interconnected and/or multiple separate networks, e.g. the Internet and the public switched telephone network. Also shown is a network 140 interconnecting the service provider 130 and multiple financial institutes 150A-150N, each financial institute is associated with at least one of the subscribers 110A-110N or the service provider 130. The network 140 is shown to be a private financial institute network, such as the currently existing ACH bank network over which it is quiet common to electronically transfer funds between banks. Here again, the network 140 could be another type of network interconnecting the service provider 130 to financial institutes 150A-150N. Also, network 140 could be multiple interconnected networks. It should be understood that a subscriber might be an individual, a business, or other organization. The service provider provides electronic commerce services to the subscribers, as will be discussed below.

Each of the subscribers 110A-110N is preferably represented on the network(s) 100 by a known network device. It should be recognized that virtually any network device could be utilized so long as the device has sufficient capabilities to function in accordance with the present invention. The term "network device" includes personal computers, personal digital assistants (PDA's), telephones, including traditional, cellular and/or digital telephones, and set-top boxes, among other devices. It will also be understood that a network device may connect to a network via a wire or wireless communications link.

The service provider 130 is preferably represented on networks 100 and 140 by at least one network server. However, here again, any network compatible device, or group of devices, which is capable of functioning in the described manner could be utilized.

The server functions as described below in accordance with stored programming instructions which drive its operation. It will be recognized that only routine programming is required to implement the instructions required to drive the server to operate in accordance with the invention, as described below. Further, since the server components and configuration are conventional, routine operations will generally not be described, such operations being well understood in the art. The server accesses a memory for storing, among different types of information stored, information associated with subscribers 120A-120N. This memory, which can be a part of, or separate from, the server will be referred to hereafter as server memory.

Figure 1B:
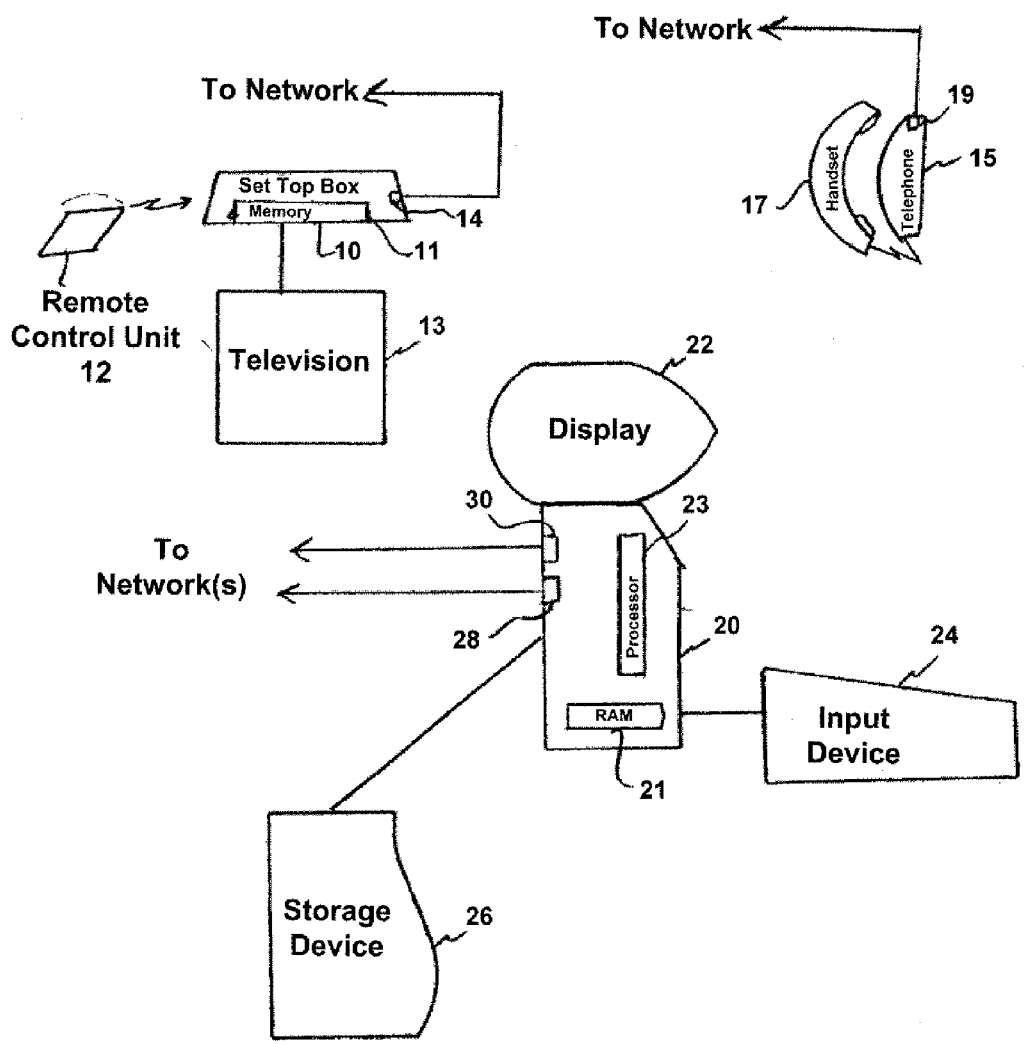
FIG. 1B depicts various network devices which may serve to represent an entity shown in FIG. 1A.

FIG. 1B is a simplified depiction of various exemplary network devices which may serve to represent an entity shown in FIG. 1A.

As shown, a subscriber may be represented by set top box 10 having a memory 11 and a port 14 for interconnecting the set top box 10 to the network(s) 100. A remote control unit 12 can be manipulated by a subscriber to input commands to the set top box 10. A television 13 serves as a display for presenting information input by the subscriber via the remote control unit 12 or received over the networks via the port 14 to the subscriber.

A subscriber, the service provider or a financial institute may also or alternatively be represented by a telephone unit 15. The telephone unit 15 includes a handset 17 and port 19 for interconnecting to the network(s) 100. In this case the port may interconnect to the public switch telephone network or to the Internet.

A subscriber, the service provider or a financial institute may also or alternatively be represented by one or more computing devices, such as that shown in FIG. 1B. The computing device may, for example, be in the form of a network server, a personal computer (PC) or workstation, a personal digital assistant (PDA), a cellular or other type wireless telephone, or some other type device As depicted, the computing device 20 includes a processor 23 and random access memory (RAM) 21. Ports 28 and 30 are provided for interconnecting to the network(s) 100 and, if applicable, the financial institute network 140. Also included is an input device 24, such as a keyboard or mouse, for inputting commands from a subscriber, service provider or financial institute, as applicable. A display 22, presents information input by the subscriber, service provider or financial institute, as applicable, via the input device 24 or received over the network(s) via the ports 28 and 30. The computing device 20 also includes a storage device 26, which could take the form of a hard or floppy disk, compact disc (CD), random access (RAM) or other type storage device. The processor 23 controls the storage of information at and retrieval of stored information from the storage device 26, based on inputs entered via the input device 24 or received from the network(s) via the ports 28 and 30. The computing device 20 operates in accordance with the programmed logic which is resident at the storage device 26 and/or RAM 21.

Zero Net Embodiment

Figure 2A:
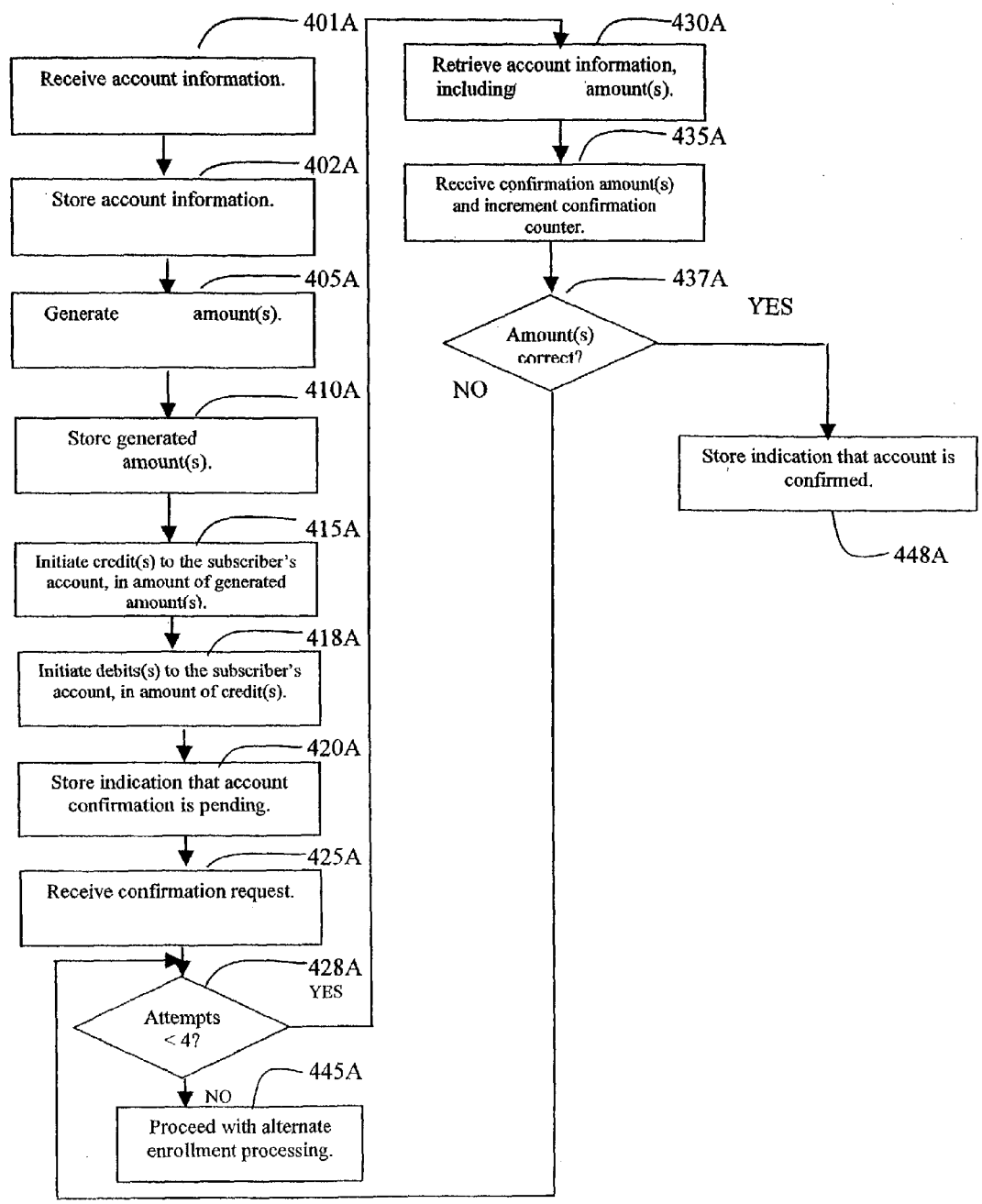
FIG. 2A is a flow chart depicting account confirmation processing in accordance with a first embodiment of the present invention.

FIG. 2A is a simplified flow chart depicting the processing of an account confirmation technique in accordance with a first embodiment of the present invention. The technique can be used to confirm accounts of new subscribers, as well as to confirm new accounts submitted by existing subscribers.

As shown at step 401A, information associated with a subscriber's account is received by the service provider 130 via network(s) 100. This information includes at least a routing and transit number associated with the financial institution at which the account is maintained and an account number of the account. The account could be a checking account, a savings account, a money market account, a line of credit, or any other type account maintained at a financial institution. At step 402A the received information is stored in the server memory, in association with information identifying the subscriber. Also at step 402A, the date upon which the account identifying information is received in stored in server memory.

At step 405A the service provider 130 generates some number of different random or other monetary amounts. For example, two amounts and between one cent and ninety-nine cents each for subscribers whose accounts are located in the United States of America could be generated. However, the number of transactions or amounts may beneficially be increased to increase the quality of the validation. Service providers located in the U.S. or other countries may, if desired, use random or other amount(s) in the local or some other currency. For example, the use of transactions of small value in low value currencies may be advantageous in some implementations. If a random amount of zero is generated, one or more new random amounts will be generated. Further, if multiple amounts are generated, the generated random or other amounts will not be the same. If one generated random amount is the same as another generated random amount, yet another random amount will typically be generated to replace the duplicate generated random amount.

In this embodiment, the service provider 130 stores an indication of each of or the sum of the generated amounts in server memory in association with the information identifying the subscriber, step 410A. The service provider 130 initiates electronic credits of the respective amounts to the subscriber's account via the network 140 from an account associated with the service provider 130 maintained at one of the financial institutes 150A-150N, in step 415A. If two amounts have been generated, then one electronic credit is in the amount of one generated amount, and the other electronic credit is in the amount of the other generated amount. If the service provider 130 generates a number of amounts different than two, that different number is the number of credits to the subscriber's account. Thus, each generated amount corresponds to one credit to the subscriber's account.

At step 418A the service provider 130 preferably initiates a single debit via network 140 to the subscriber's account in the combined amount of the credits. The debit is in favor of an account associated with the service provider 130. This could be the same account, or a different account, from which the funds were credited to the subscriber's account. Of course, the service provider could also initiate the some or some other number of debits to the subscriber's account as the number of credits to the subscriber's account. The debit, or debits, to the subscriber's account restores the credited amounts to the service provider's account. The debiting of step 418A could be performed prior to the crediting of step 415A, or concurrent with the crediting of step 415A. At step 420A the service provider 130 stores an indication in server memory that the account is an unconfirmed account.

Optionally, the service provider 130 could also notify the subscriber by e-mail that confirmation transactions have been initiated. This e-mail could include instructions directing the subscriber how to confirm the account.

To validate or confirm the account, the subscriber must determine the amount of each or the sum of the credits to his or her account. The subscriber can obtain this information from a bank statement generated by the financial institution at which the account is maintained, can obtain the information from an on-line user interface hosted by the financial institution at which the account is maintained, can obtain the information from a telephone banking system hosted by the financial institution at which the account is maintained, or directly from a representative of the financial institution at which the account is maintained. At step 425A the service provider 130 receives a subscriber's request to validate the account. Preferably this request is a request to view a Web page, as described below, received via network(s) 100.

At step 428A, the service provider 130 determines if the subscriber has previously attempted to validate the account less than four or some other selected number of times. To do so, the service provider 130 accesses a confirmation counter, which records each of the subscriber's attempts at account confirmation, and determines if its value is three or less or otherwise less than the selected number of attempts which will be allowed. If so, operations continue with step 430A. If not, operations continue with step 445A, to be discussed further below.

At step 430A the service provider 130 retrieves information associated with the account, including the previously generated individual credit amounts or a stored sum of the credit amounts, from server memory. The service provider 130, as shown in step 435A, also receives from the subscriber information identifying each of the credited amounts. Upon receipt of this information, the service provider 130 increments the confirmation counter. It should be noted that steps 430A and 435A could be performed in the opposite order, or essentially concurrently.

At step 437A, the service provider 130 determines if the received information does in fact represent the respective credited amounts or their sum. If so, the subscriber has successfully validated the account, and the service provider 130 stores an indication in server memory that the account is a confirmed account, in step 448A. If not, operations continue with step 440A.

As discussed above, a single or multiple debits could be performed together with a single or multiple credits. It should be noted that, in such cases the received subscriber information could be required to identify each or the sum of the details to the subscriber's account.

It should also be understood that, a function of the credits or debits or both, other than a sum, could and in some implementations will preferably be utilized for verification. For example, the service provider might specify a selected function such as (credits×100)−(debits×10) to further enhance the quality of the verification. Those skilled in the art will recognize that various functions could be applied and utilized to provide a desired level of verification quality. Hence, by selecting a suitable function, it can be easily ensured that the account confirmation performed reduces the risk to the service provider to an acceptable level. Additionally, the function can be varied for different subscribers or groups, e.g. categories, of subscribers, based on the service provider's perceived potential risk with respect to that particular subscriber, e.g. as a function of analyzing available information about the subscriber, or group of subscribers, e.g. as a function of the subscriber's association with a particular sponsor, biller or other type of payee. In such a case, the sum function may be applied to verify an account for a particular subscriber or accounts of members of a particular group, while the function (credits×100)−(debits×10) is applied to verify an account for another subscriber or the accounts of members of another group of subscribers.

It may also be beneficial, for the verification by the subscriber to be performed using a different network and/or a different verification user interface, from that used for identifying the account information. For example, if the subscriber provides account information using a PC interconnected to the Internet, the subscriber may be required to provide the transaction information necessary to verify the subscriber's account via telephone interconnected to a public switch telephone network. In such a case, the subscriber could, for example, be viewing his/her bank statement on a bank's Web site, via his/her PC interconnected to the Internet, while verifying the account to the service provider via his/her telephone interconnected to the public switched telephone network. This will avoid any need for the subscriber to write down or memorize the transaction information, or to flip between the bank and service provider Web site presentations. Hence, any subscriber having the capability to access the Internet and place telephone calls at the same time, such as a subscriber using a cable modem rather than a telephone line for interconnecting to the Internet, could benefit from such an implementation.

If, at step 428A, the service provider 130 determines that the subscriber is attempting to validate the account more than the allowed number of times, operations continue with step 445A, in which the subscriber must enroll using an alternate method, such as traditional paper enrollment.

No Credit Embodiment

Figure 2B:
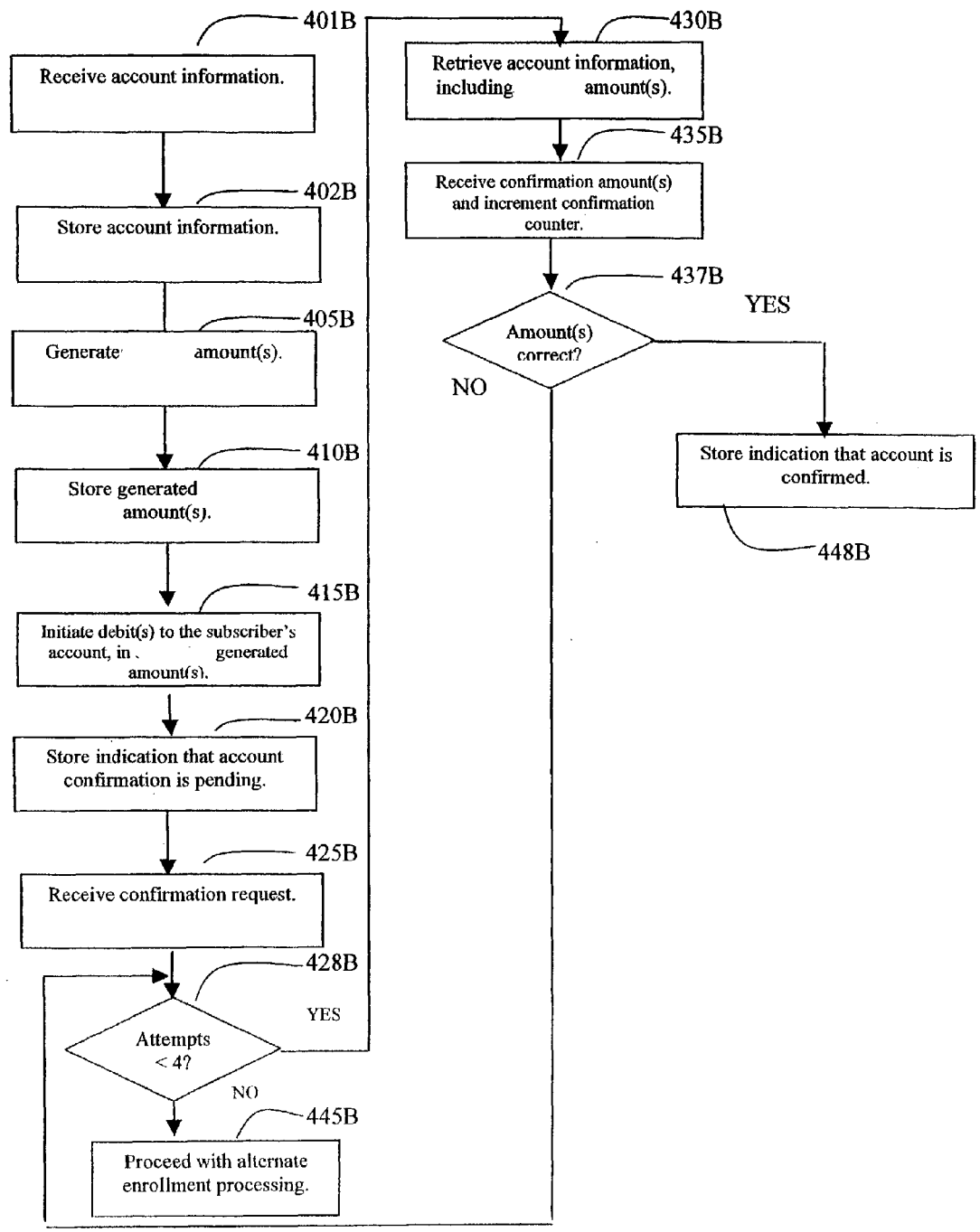
FIG. 2B is a flow chart depicting account confirmation processing in accordance with a second embodiment of the present invention.

FIG. 2B is a simplified flow chart depicting the processing of an account confirmation technique in accordance with a second embodiment of the present invention. As shown at step 401B, information associated with a subscriber's account is received by the service provider 130 via network(s) 100. This information includes at least a routing and transit number associated with the financial institution at which the account is maintained and an account number of the account. As in the first embodiment, the account could be a checking account, a savings account, a money market account, a line of credit, or any other type account maintained at a financial institution. At step 402B the received information is stored in server memory, in association with information identifying the subscriber. Also at step 402B, the date upon which the account identifying information is received in stored in server memory.

At step 405B the service provider 130 generates some number of different random or other monetary amounts, as has been previously described with reference to FIG. 2A.

The service provider 130 stores an indication of each of or the sum of the generated amounts in server memory in association with the information identifying the subscriber and the appropriate account, in step 410B. The service provider 130 initiates electronic debits to the subscriber's account via the network 140 to an account associated with the service provider 130 maintained at one of the financial institutes 150A-150N, in step 415B. If two amounts have been generated, then one electronic debit is in the amount of one generated amount, and the other electronic debit is in the amount of the other generated amount. If the service provider 130 generates a number of amounts different than two, that different number is the number of debits to the subscriber's account. Thus, each generated amount corresponds to one debit to the subscriber's account.

To validate or confirm the account, the subscriber must determine the amount of each or the sum of the debits from his or her account, as discussed above. At step 425B the service provider 130 receives a subscriber's request to validate the account.

At step 428B, the service provider 130 determines if the subscriber has previously attempted to confirm the account too many times, as discussed above. If not, operations continue with step 430B. If so, operations continue with step 445B, to be discussed further below.

At step 430B the service provider 130 retrieves information associated with the account, including the previously generated individual amounts or a stored sum of the debit amounts, from server memory. The service provider 130, as shown in step 435B, also receives from the subscriber information identifying each of or the sum of the debited amounts.

Upon receipt of this information, the service provider 130 increments the confirmation counter.

At step 437B, the service provider 130 determines if the received information does in fact represent the respective debited amounts or their sum. If so, the subscriber has successfully validated the account, and the service provider 130 stores an indication in server memory that the account is a confirmed account, in step 448B. If not, operations continue with step 440B.

If, at step 428B, the service provider 130 determines that the subscriber is attempting to validate the account more than the allowed number of times, operations continue with step 445B, in which the subscriber must enroll using an alternative method, such as traditional paper enrollment.

In the second embodiment, the service provider 130 does not credit the subscriber's account as a part of the confirmation process. Preferably, the debited amounts are retained by the service provider 130 and applied to any fees incurred by the subscriber, such as initiation or service fees. However, subsequent to successful confirmation, the electronically debited amount(s) could be electronically credited back to the subscriber's account.

Add Payment Account

Figure 3A:
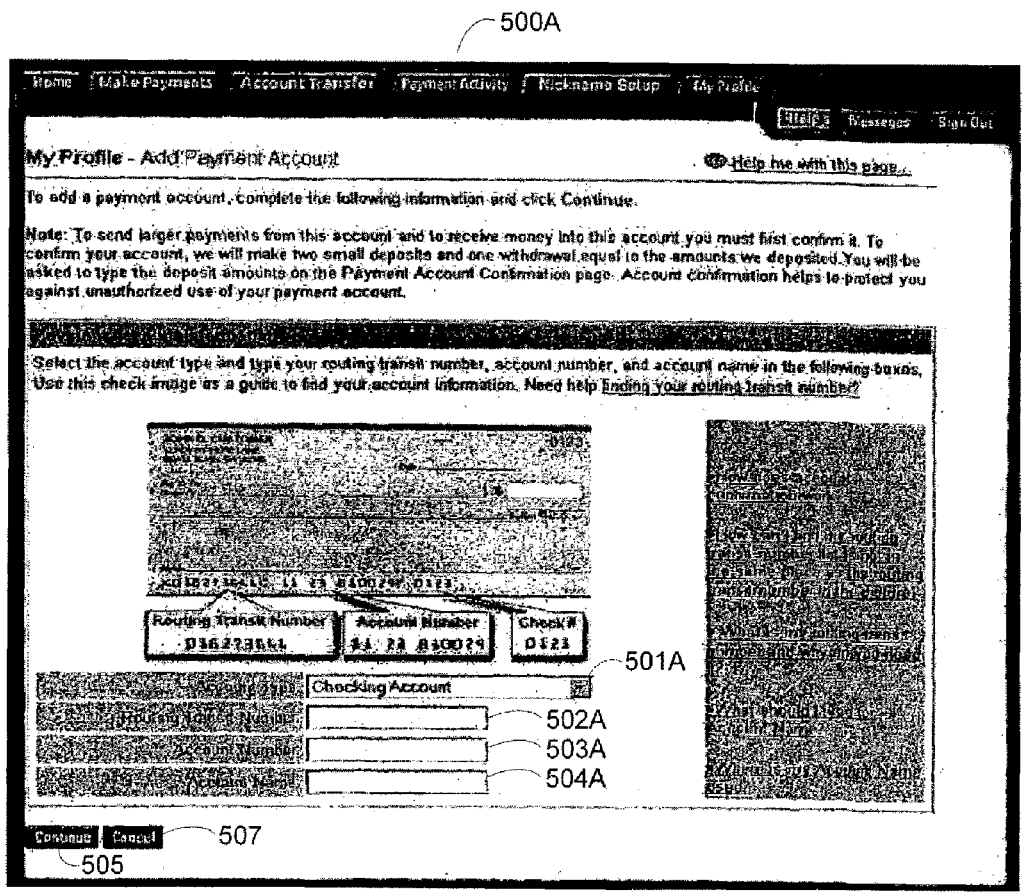
FIG. 3A is an exemplary screen shot of an Add Payment Account page in accordance with the first embodiment of the present invention.

FIG. 3A is a screen shot of an exemplary Web page 500A hosted by the service provider 130 for a subscriber to provide account information in accordance with the first embodiment. This Web page, labeled as a "My Profile-Add Payment Account" page, is but one page of a unified user presentation. Other pages that are a part of the unified user presentation will be discussed further below.

The "My Profile-Add Payment Account" page 500A includes several fields for the subscriber to enter information. These fields include an entry point, in the form of a pull-down menu, for entry of the type of account 501A, in this instance shown as a checking account. The Web page also includes an entry point for a routing transit number 502A, account number 503A, and an account name 504A. The account name can be any name the subscriber desires. It should be understood that an account name is not required. Upon completion of these fields, the subscriber selects the "continue" button (a hyper-link) 505A to cause the information to be transmitted to the service provider 130. Activation of the "cancel" button 507A returns the subscriber to the previously presented Web page. The "My Profile-Add Payment Account" page 500A also includes information informing the subscriber that the account must be confirmed and how confirmation takes place.

Though not shown in FIG. 3A, this Web page could also include entry points for the subscriber to enter enrollment information such as his or her name, address, and other identifying information, such as birth date and social security number. Though, preferably, the first time this information is submitted to the service provider 130, i.e., during enrollment, it is submitted via a separate Web page (not shown) which is a part of the unified user presentation.

Figure 3B:
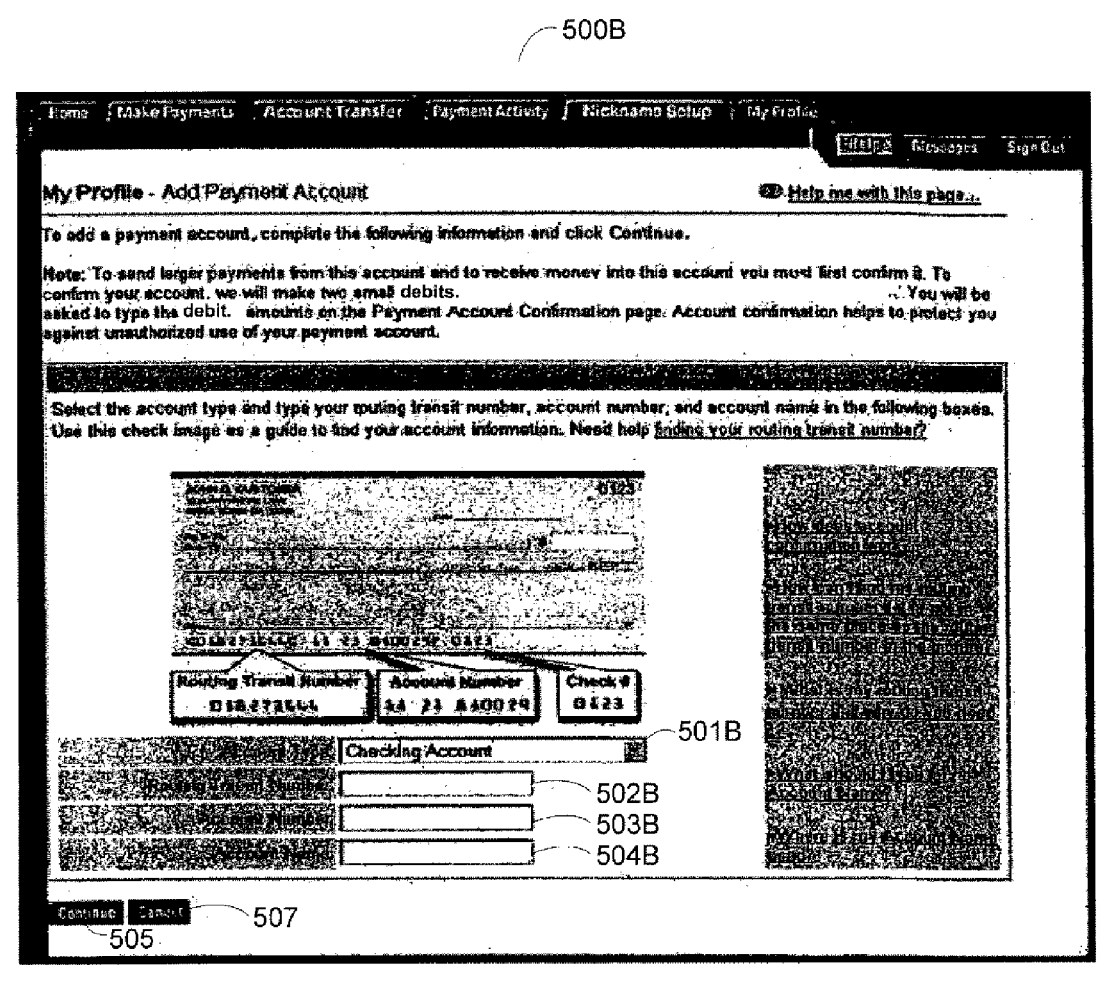
Figure 5A:
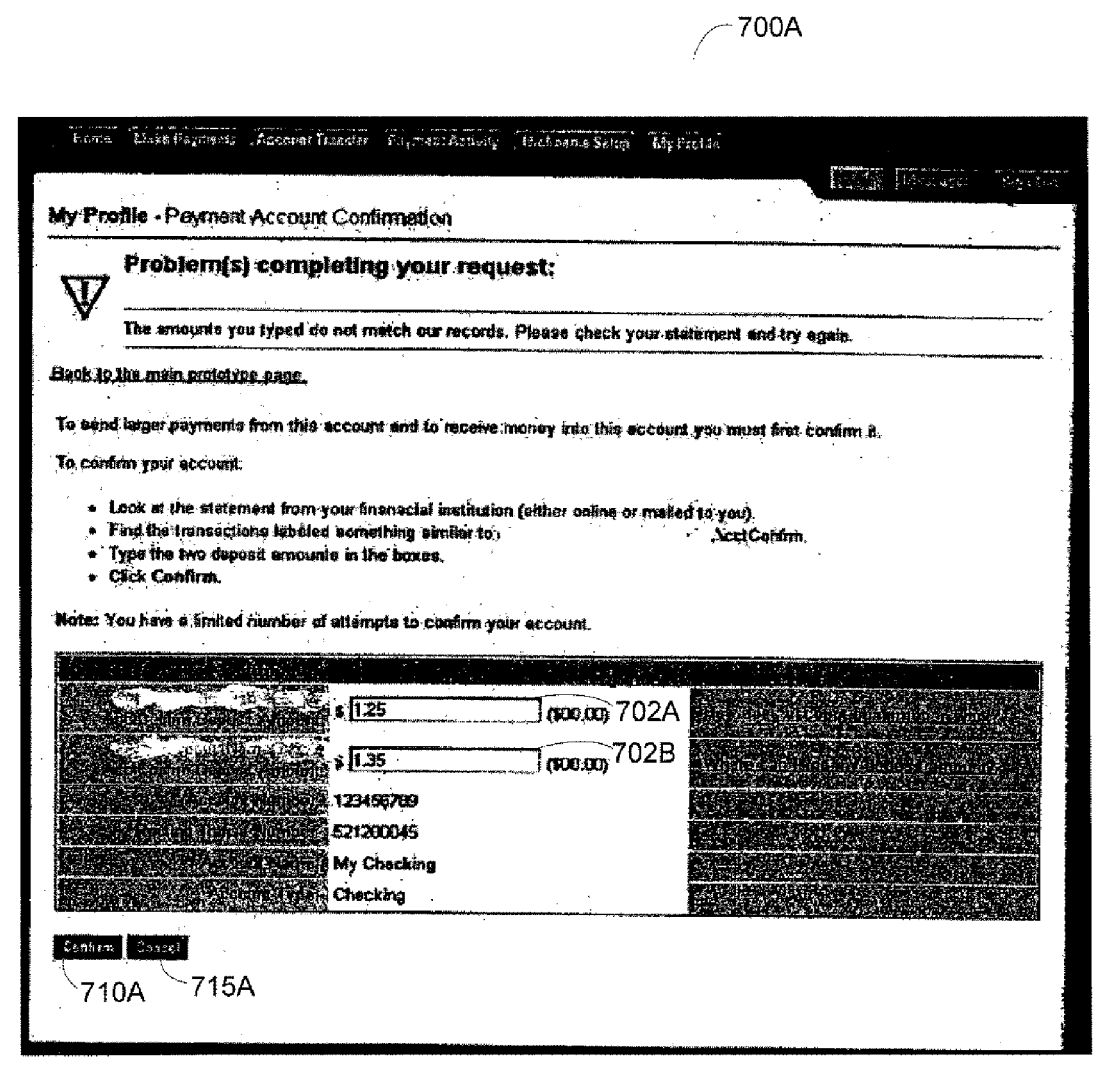
Figure 5B:
FIG. 5B is an exemplary screen shot of a Payment Account Confirmation page for display when incorrect information has been provided in accordance with the second embodiment of the present invention.

FIG. 3B is a screen shot of an exemplary Web page 500B hosted by the service provider 130 for a subscriber to provide account information in accordance with the second embodiment. This Web page is labeled as a "My Profile-Add Payment Account" page, as is FIG. 3A. FIG. 5B differs from FIG. 3A in that FIG. 3B informs the subscriber that confirmation includes the service provider debiting the subscriber's account, instead of the debiting and crediting of the first embodiment. This "My Profile-Add Payment Account" screen 500B includes the same fields as the "My Profile-Add Payment Account" screen 500A associated with the first embodiment. These fields include an entry point, in the form of a pull-down menu, for entry of the type of account 501B, in this instance shown as a checking account. The Web page also includes an entry point for a routing transit number 502B, account number 503B, and an account name 504B. It should be understood that an account name is not required. An account name can be any name the subscriber desires. Upon completion of the required fields, the subscriber selects a "continue" button (a hyper-link) 505B to cause the information to be transmitted to the service provider 130. Activation of the "cancel" button 507B returns the subscriber to the previously presented Web page.

Payment Account Confirmation

Figure 4A:
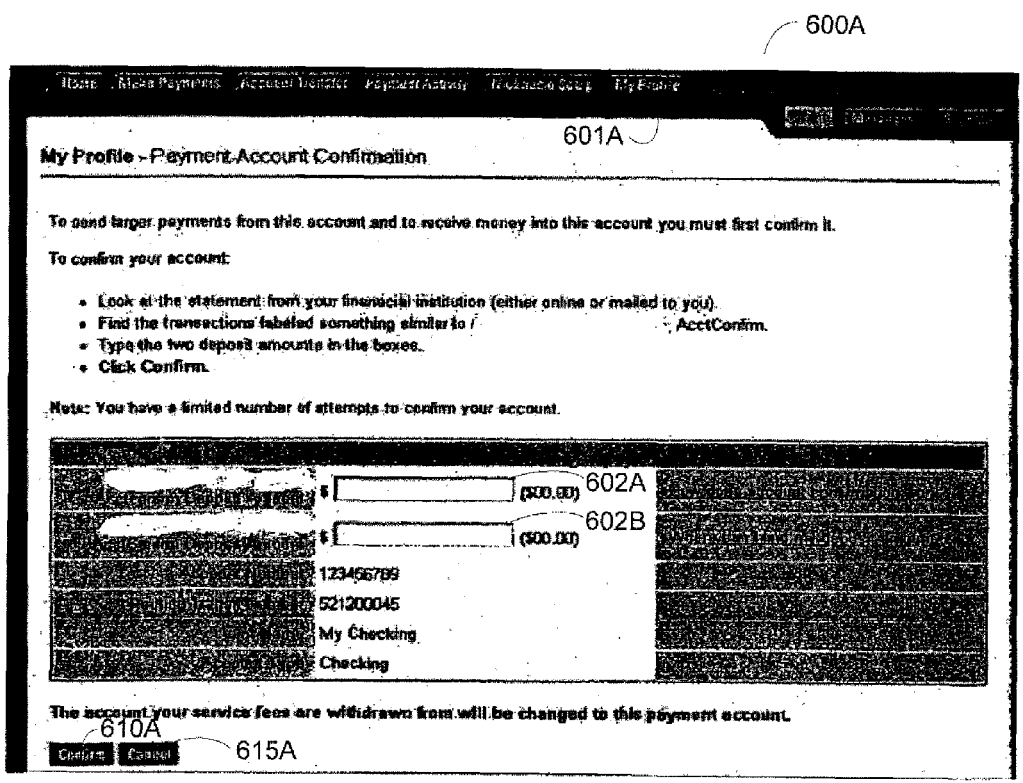
FIG. 4A is an exemplary screen shot of a Payment Account Confirmation page in accordance with the first embodiment of the present invention.

FIG. 4A is a screen shot of an exemplary Web page 600A hosted by the service provider 130 for a subscriber to confirm an account in accordance with the first embodiment. This Web page, labeled as a "My Profile-Payment Account Confirmation" page, is a part of the unified user presentation. This Web page can be accessed by a subscriber upon entering the unified user presentation by selection of the "My Profile" tab 601 (which is a hyper-link) shown in FIG. 4A. After selection of the My Profile tab 601A, the subscriber selects a displayed hyper-link to access the "My Profile-Payment Account Confirmation" Web page 600A. As will be discussed further below, the "My Profile-Payment Account Confirmation" Web page 600 can also be accessed from other Web pages which are presented as a part of the service or services offered by the service provider 130.

The "My Profile-Payment Account Confirmation" page 600A includes fields for the subscriber to enter the amount of the deposits 602A and 602B. After the subscriber enters in the amounts of the deposits, the subscriber selects a "confirm" link 610. Activation of the "confirm" link 610A causes the information to be transmitted to the service provider 130. Activation of the "cancel" link 615A causes the previous Web page the subscriber was viewing to be presented to the subscriber. The "My Profile-Payment Account Confirmation" page 600A also includes instructions for the subscriber as to how to confirm the account, as well as information identifying the account that is stored in server memory. The page also informs the subscriber that he or she only has a limited number of attempts to confirm the account.

Figure 4B:
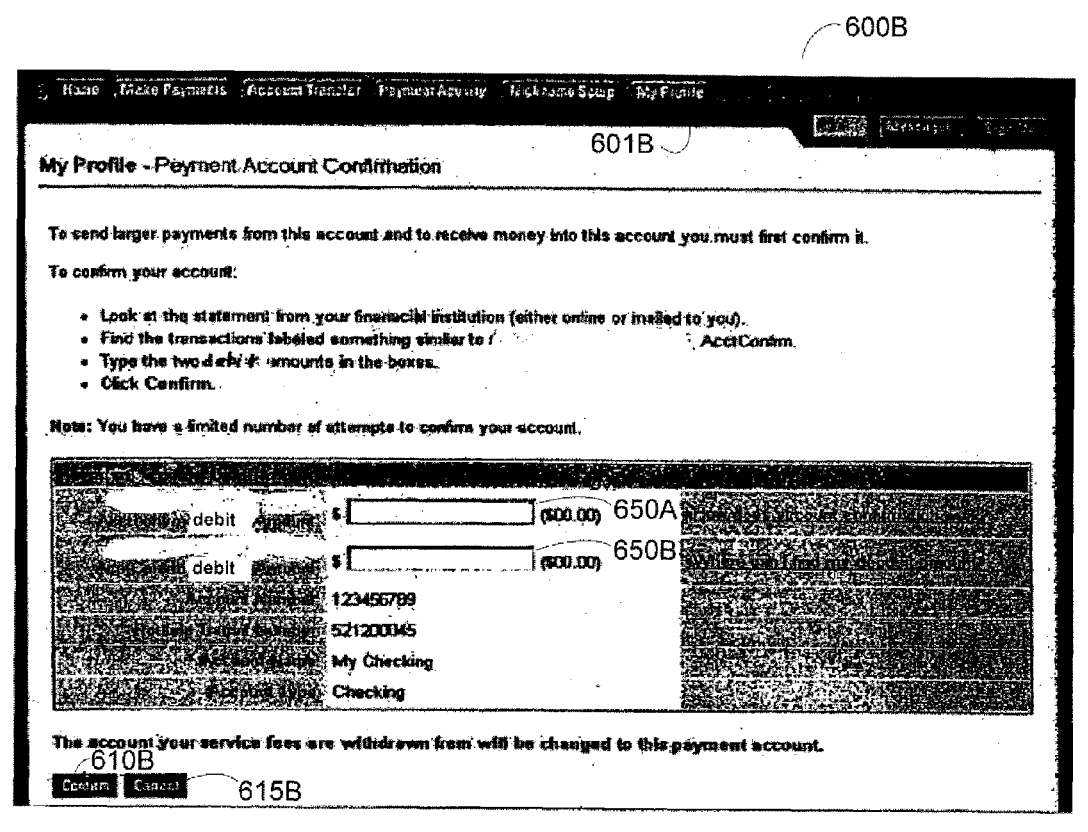

FIG. 4B is a screen shot of an exemplary "My Profile-Payment Account Confirmation" page 600B hosted by the service provider 130 for a subscriber to confirm an account in accordance with the second embodiment. As with the Web page depicted in FIG. 4A, this Web page can be accessed by a subscriber upon entering the unified user presentation by selection of the "My Profile" tab 601B. This "My Profile-Payment Account Confirmation" page 600B includes fields for the subscriber to enter the amount of the debits 650A and 650B. After the subscriber enters in the amounts of the debits, the subscriber selects a "confirm" link 610B. Activation of the "confirm" link 610B causes the information to be transmitted to the service provider 130. Activation of the "cancel" link 615B causes the previous Web page the subscriber was viewing to be presented to the subscriber. As in FIG. 4A, this "My Profile-Payment Account Confirmation" page 600B also includes instructions for the subscriber as to how to confirm the account. The page also informs the subscriber that he or she only has a limited number of attempts to confirm the account.

Payment Account Confirmation Failure

FIG. 5A is a screen shot of an exemplary Web page 700A hosted by the service provider 130 for display when a subscriber does not provide the correct deposit amount(s) and the number of subscriber attempts to confirm the account is less than four in accordance with the first embodiment. That page is transmitted if the determination of step 428A is positive. The page includes fields for the subscriber to again enter the amount of the deposit(s) 702A and 702B. After the subscriber enters in the amounts of the deposit(s), the subscriber selects a "confirm" link 710A. Activation of the confirm link 710A causes the information to be transmitted to the service provider 130. Activation of the "cancel" link 715A causes the previous Web page the subscriber was viewing prior to attempting to confirm the account to be presented to the subscriber.

FIG. 5B is a screen shot of an exemplary Web page 700B hosted by the service provider 130 for display when a subscriber does not provide the correct debit amount(s) and the number of subscriber attempts to confirm the account is less than four in accordance with the second embodiment. This page is transmitted if the determination of step 428B is positive. The page includes fields for the subscriber to again enter the amount of the debit(s) 750A and 750B. After the subscriber enters in the amounts of the deposit(s), the subscriber selects a "confirm" link 710B. Activation of the confirm link 710B causes the information to be transmitted to the service provider 130. Activation of the "cancel" link 715B causes the previous Web page the subscriber was viewing prior to attempting to confirm the account to be presented to the subscriber.

Payment Account Confirmation Default

Figure 6:
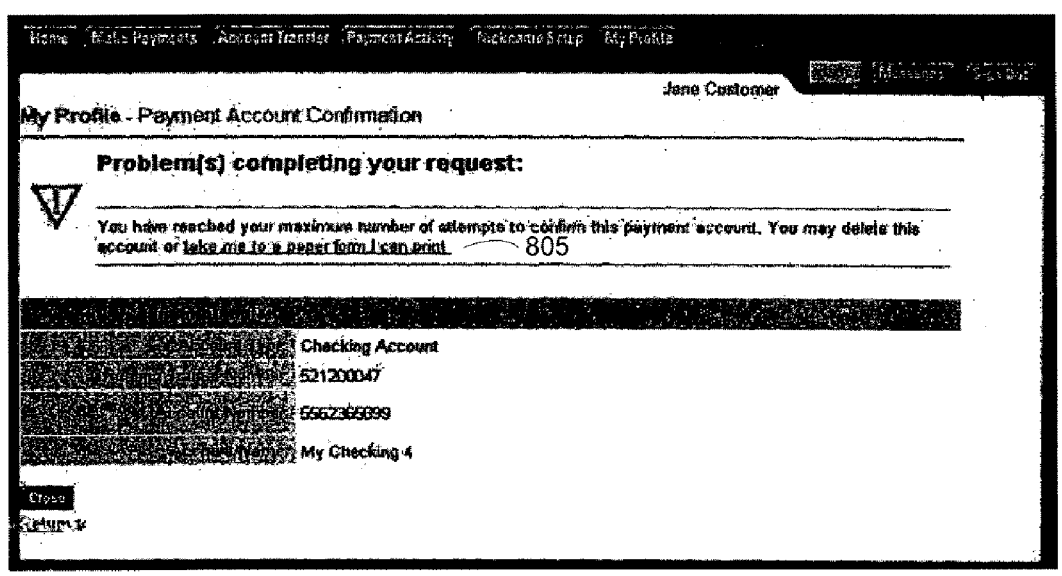
FIG. 6 is an exemplary screen shot of a Payment Account Confirmation page for display when incorrect information has been provided a maximum number of times in accordance with the first and second embodiments of the present invention.

FIG. 6 is a screen shot of an exemplary Web page 800 hosted by the service provider 130 for display when a subscriber has reached the maximum number of attempts to confirm the account in both the first and second embodiments. This screen is for display if the determination in step 428A of the first embodiment is negative, and if the determination in step 428B of the second embodiment is negative. The page includes information informing the subscriber that he or she has reached the maximum number of attempts to confirm the account, as well as information identifying the account, which is stored in server memory. The page also can include a link 805 to an account confirmation form suitable for printing by the subscriber, when the alternative enrollment processing is traditional paper enrollment.

Alternative Payment Account Confirmation

Figure 7:
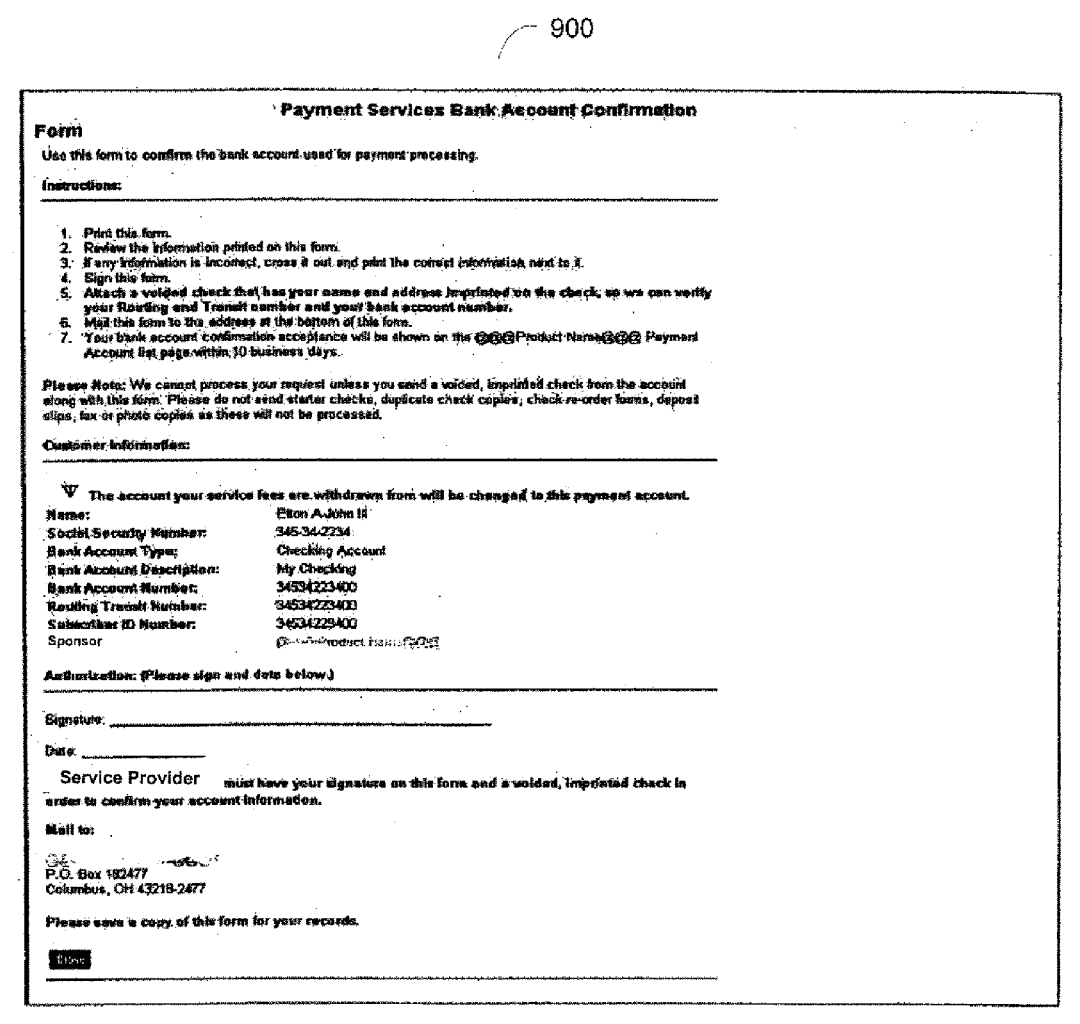

FIG. 7 is a screen shot of an exemplary Web page 900 for paper account confirmation which can be presented in both the first and the second embodiments. As shown, the page is pre-populated with information identifying the account and information identifying the subscriber. This information is stored in server memory and retrieved whenever this page is presented. The subscriber prints this page and delivers it to the service provider 130.

Alternative confirmation, by paper, or otherwise, is triggered by any of several factors. One factor is that the subscriber's account is not reachable electronically. That is, the financial institution maintaining the account must allow electronic debits and credits to the account. If not, another account confirmation method is required. Another factor triggering alternative account confirmation is the subscriber being unable to correctly provide information indicating the amounts credited or debited to the account. Yet another factor triggering alternative account confirmation by paper is if a subscriber is associated with three unconfirmed accounts.

Payment Account Confirmation-Inaccessible Account

Figure 8A:
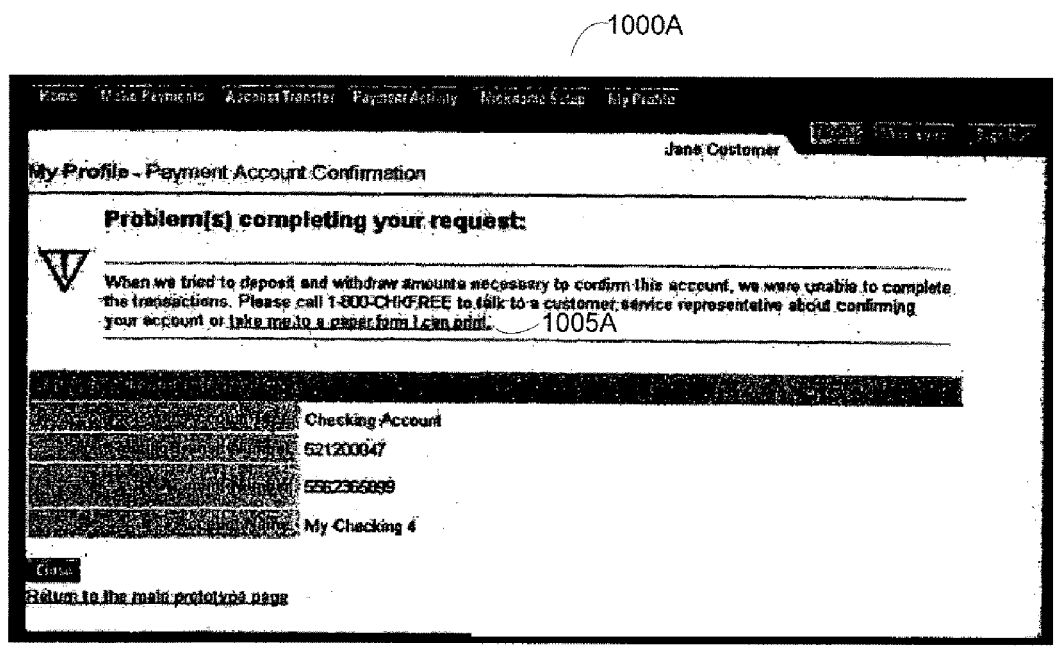
FIG. 8A is an exemplary screen shot of a Payment Account Confirmation page for display when an account is inaccessible in accordance with the first embodiment of the present invention.

FIG. 8A is a screen shot of an exemplary Web page 1000A hosted by the service provider 130 for display when a subscriber attempts to confirm an account that the service provider was unable to deposit funds into, in accordance with the first embodiment. Thus, following step 425A, the service provider 130 determines if funds were successfully credited into the subscriber's account. If not, this page is displayed.

The Web page includes information informing the subscriber that account confirmation for the account is unavailable, information identifying the account, as well as optionally a link 1005A to a paper confirmation page, discussed above and shown in FIG. 7.

Figure 8B:
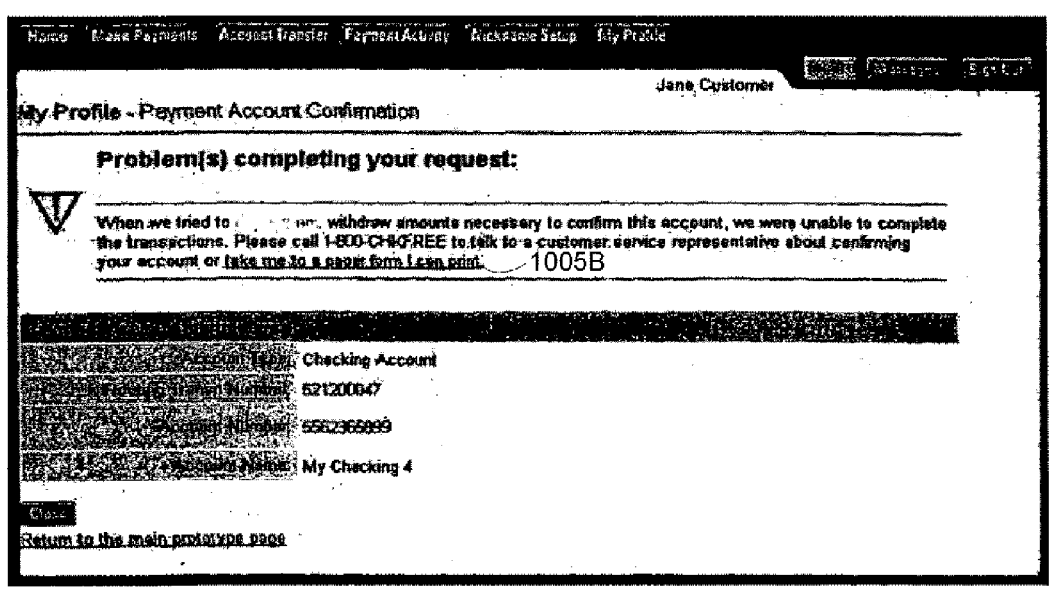
FIG. 8B is an exemplary screen shot of a Payment Account Confirmation page for display when an account is inaccessible in accordance with the second embodiment of the present invention.

FIG. 8B is a screen shot of an exemplary Web page 1000B hosted by the service provider 130 for display when a subscriber attempts to confirm an account that the service provider was unable to debit, in accordance with the second embodiment. Thus, following step 425B, the service provider 130 determines if funds were successfully debited from the subscriber's account. If not, this page is displayed. The Web page includes information informing the subscriber that account confirmation for the account is unavailable, information identifying the account, as well optionally as a link 1005B to a paper confirmation page.

Payment Account Information

Figure 9:
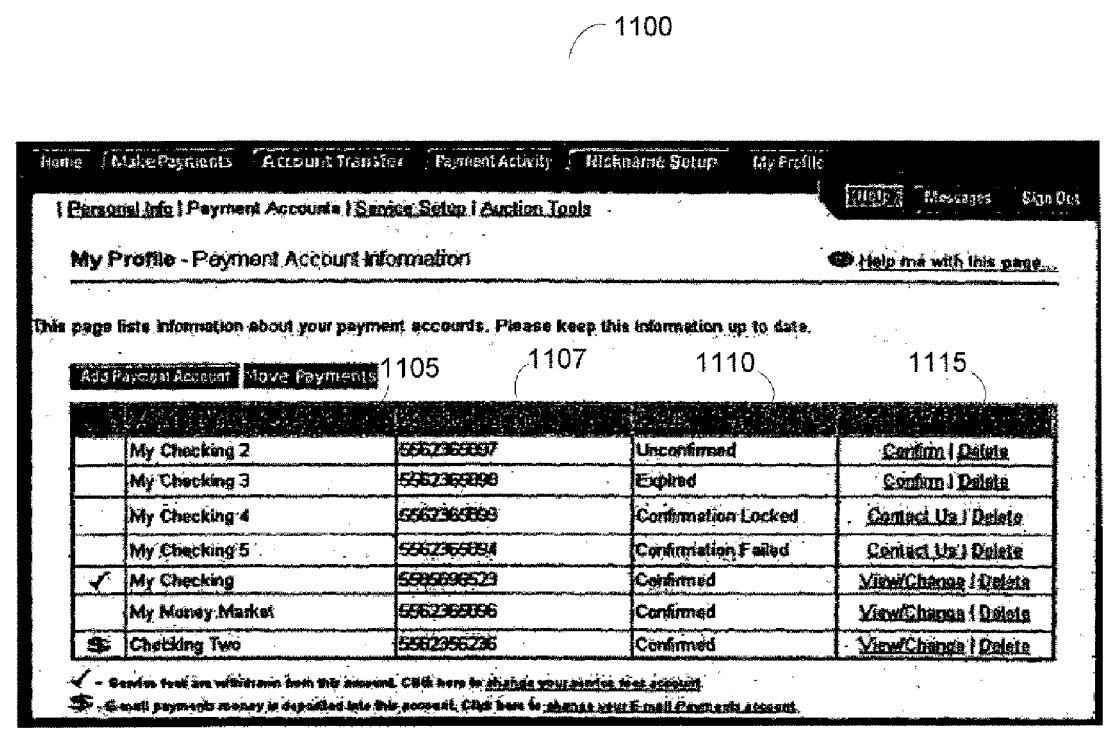

FIG. 9 is a screen shot of an exemplary, but optional, Web page 1100 hosted by the service provider 130 for a subscriber to view the status of his or her account(s) which the service provider 130 accesses in providing service or services to the subscriber in accordance with both the first and the second embodiments. This Web page, labeled as a "My Profile-Payment Account Information" page, is a part of the unified user presentation. As shown in exemplary FIG. 9, information associated with each account a subscriber has submitted for confirmation includes an account name 1105, designated by the subscriber, the account number 1107, an account status 1110, and other links 1115.

All accounts, in both the first and second embodiments, have one of five possible statuses. The status of each account is stored in server memory. An account designated as "unconfirmed" is an account to which the service provider 130 has initiated the confirmation (credit(s) and debit(s), or only debit(s)) transaction(s), but the subscriber has yet to confirm the amount(s).

An account designed as "expired" is an account to which the service provider 130 has initiated the confirmation transaction(s), but the subscriber has yet to confirm the credited or debited amount(s), and a pre-designated amount of time, preferably 45 days, has elapsed since initiation of the confirmation transaction(s). Expired accounts can be confirmed. However, payments cannot be requested to be made from accounts having the status of expired.

An account designated as "confirmation locked" is an account in which the subscriber has unsuccessfully attempted to confirm the credited or debited amount(s) three times. "Confirmation locked" accounts must be confirmed by alternative confirmation methods. Payments cannot be requested to be made from accounts having the status of "confirmation locked".

An account designated as "confirmation failed" is an account to which the service provider 130 could not complete the confirmation transaction(s). "Confirmation failed" accounts must be confirmed by alternative account confirmation methods. Payments cannot be requested to be made from accounts having the status of "confirmation failed.

An account designed as "confirmed" is an account for which the service provider 130 is satisfied that the account is associated with the subscriber. This satisfaction can be obtained in several ways. In one, the subscriber has successfully confirmed the account by providing information indicating the credited or debited amount(s) to the service provider 130. In another, alternative account confirmation of the account has been completed. In another, a sponsor guarantees the association, as will be further discussed below. Upon successful confirmation of an account an indication as to the date of confirmation and the method of confirmation is stored in server memory.

In the example of FIG. 9, seven accounts have been submitted for confirmation. Three of the accounts are confirmed accounts, as indicated in the status column 1110. As shown, from embedded links in the "other" column 1115 the subscriber can delete these confirmed accounts, as well as any submitted account with any status. A deleted account is an account which the service provider 130 can no longer access in providing services to the subscriber.

Also in the example of FIG. 9, one account has the status of "confirmation failed". Associated with this account is a "contact us" link 1130A. Activation of the "contact us" link 1130A causes the Web page as depicted in FIG. 8A or 8B to be presented to the subscriber, pre-populated with information associated with the account with which the link is associated. Another account has the status of "confirmation locked". Associated with this account is another "contact us" link 1130B. Activation of the "contact us" link 1130B causes a Web page as depicted in FIG. 6 to be presented to the subscriber, pre-populated with information associated with the account with which the link is associated. Yet another account has the status of "unconfirmed", and still another has the status of "expired". Each of these accounts is associated with a respective "confirm." Activation of either of these links causes a page as depicted in FIG. 4A or FIG. 4B to be presented to the subscriber, pre-populated with information associated with the respective account with which the respective link is associated.

It should be noted that a subscriber can be prevented from having more than a certain number unconfirmed accounts at any given time, preferably three. Server memory includes a stored indication of the number of unconfirmed accounts associated with each subscriber. For those subscribers having the maximum number of unconfirmed accounts, the "My Profile-Payment Account Information" page 1100 presented to those subscribers will include information informing that to add another account, alternative account confirmation must be used. A link to the paper account confirmation page 900 can be displayed.

The present invention supports sponsor-subscriber relationships. A sponsor is an entity which provides access to the service provider 130 to one or more subscribers. Examples of sponsors include financial institutions, Web portals, or other types of Web sites or business entities. A subscriber which is provided access to the service provider 130 by a sponsor preferably accesses a Web site hosted by the sponsor and is then redirected to the unified presentation hosted by the service provider 130. The fact that the service provider 130 is providing the functionality described herein can be unknown to a subscriber. That is, the service provider 130 acts behind the scenes on behalf of a sponsor. In such situations, the Web pages described herein presented to such subscribers will not contain any information identifying the service provider 130. Rather, the Web pages will include information identifying the particular sponsor with which a subscriber is associated. An indication of any sponsor-subscriber relationships is stored in server memory.

Some sponsors can choose to guarantee the association between a subscriber and the subscriber's account, as introduced above. In such instances, the processing to confirm an account described above is not performed. Rather, for those subscribers having a guaranteed association, upon submission of information identifying an account, the status of that account is directly set to "confirmed".

Payment Processing

Payments can be made from both confirmed and unconfirmed accounts in both the first and second embodiments of the present invention. FIG. 10 is an exemplary flow chart showing the operations in processing a subscriber's request for payment. As shown in step 1401, a request to submit a payment request is received from a subscriber. In this example, the subscriber is known to the service provider 130. That is, information identifying the subscriber is stored in server memory. The service provider 130 accesses server memory and determines if the subscriber is associated with any accounts having the status of "confirmed" or "unconfirmed", step 1402. If not, the subscriber is informed that a payment request cannot be accepted until the subscriber is associated with at least one account having either a "confirmed" or an "unconfirmed" status, step 1405.

If the subscriber is associated with either confirmed or unconfirmed accounts, the service provider 130 presents a payment submission form to the subscriber, step 1408. Preferably, this page includes a drop down menu populated with those accounts which can be used for payment. At step 1410 the service provider 130 receives a payment request of the subscriber. The service provider 130 then determines if the payment request requests payment from a confirmed account, step 1415. If so, operations continue with step 1450, to be discussed below.

For an account having the status of "unconfirmed", the subscriber is restricted in requesting future dated payments. That is, any payment request that requests payment be made on a date other than the date the request is received must be a request to make a payment on a date which meets one or more predetermined criteria. Preferably, that predetermined criteria is any date that is 45 days after initial submission of an account for confirmation. Thus, any future dated payment request must be a request to make payment on a date which is less than 45 days (or another preferred period) from the date the unconfirmed account was submitted for confirmation.

If the payment request requests payment from an unconfirmed account, operations continue with step 1418 in which the service provider 130 determines if the payment request is a request for payment to be made on a future date. If so, at step 1420, the service provider 130 accesses server memory and determines the date upon which the unconfirmed account from which payment is being requested was submitted for confirmation. The service provider 130 then determines if the requested future payment date is a validate, step 1422.

If the future dated payment date is a date which is more than the preferred period from the date the account was submitted for confirmation, the date is not a valid date and the subscriber is informed of such, step 1424. If the future dated payment date is a valid date, operations continue with step 1425. It should be noted that an account that is not confirmed in the preferred period, e.g. within 45 days, has the status of "expired".

Though in the first and second embodiments payments from unconfirmed accounts as well as confirmed accounts can be made, a subscriber is restricted in the total value of payments he or she is able to make from an unconfirmed account. Preferably, for those subscribers located in the United States of America, this limited amount is $150.00, though it could be a different amount. Further, different amounts can be associated with different subscribers, based upon various factors and reasons. For example, the limited amount could vary according to a sponsor with which a subscriber is associated. Also, the limited amount could vary by payee. That is, the service provider 130 could vary the limited amount for certain payees based upon past experiences with these payees. Further, limited amounts could vary by certain payees based upon business agreements with those payees. For those subscribers located in countries other than the United States of America, the limited amount will be an amount in the currency of the country in which a subscriber is located. It should be noted that the amount of any confirmation debit, as well as any service provider fees associated with providing service or services to a subscriber, will not be included in determining if payments from an unconfirmed account have reached the limited amount. Information indicating the limited amount is stored in server memory. At step 1425 the service provider accesses server memory to identify the limited amount.

The service provider 130 then determines if the amount of the payment requested by the subscriber is more than the limited amount, step 1430. If so, the service provider 130 informs the subscriber that the payment amount is not valid, step 1432.

If the amount of the payment requested by the subscriber is less than the limited amount, the service provider 130 then determines the amount of payments previously made on behalf of the subscriber from the unconfirmed account from which the subscriber is now requesting that payment be made (i.e., payment account), step 1435. Each time the service provider 130 makes a payment on behalf of a subscriber, information associated with the payment, including the payment amount and payment account, is stored in server memory. Thus, to determine the amount of payments previously made from this payment account, if any, the service provider 130 accesses server memory and retrieves the information indicating the previous payment amounts, if any. The retrieved payment amounts and the amount of the payment request being processed are added together.

The service provider 130 then determines if this total of past payment amounts from the payment account plus the amount of the payment request being processed is greater than the limited amount, step 1438. If so, the service provider 130 informs the subscriber that the payment amount is not valid, step 1432. If the payment request is accepted for payment, payment is made on behalf of the subscriber, step 1450.

Alternatively, there could be a different limit for the sum total of all previous payments than on a per-payment basis. Also, though not depicted in the Figures, there could also be a limited number of payments which may be made from an unconfirmed account, irrespective of any limited monetary amounts.

If the subscriber submits multiple requests for payment from an unconfirmed account at the same time, similar processing to what is described above is performed. First, if any one of the multiple requested payments is more than the limited amount, none of the payment requests will be accepted for processing. Secondly, if the total of previous payments from the unconfirmed account plus the total of the multiple payments is more than the limited amount, none of the payment requests will be accepted for processing.

Make a Single Payment

Figure 11:
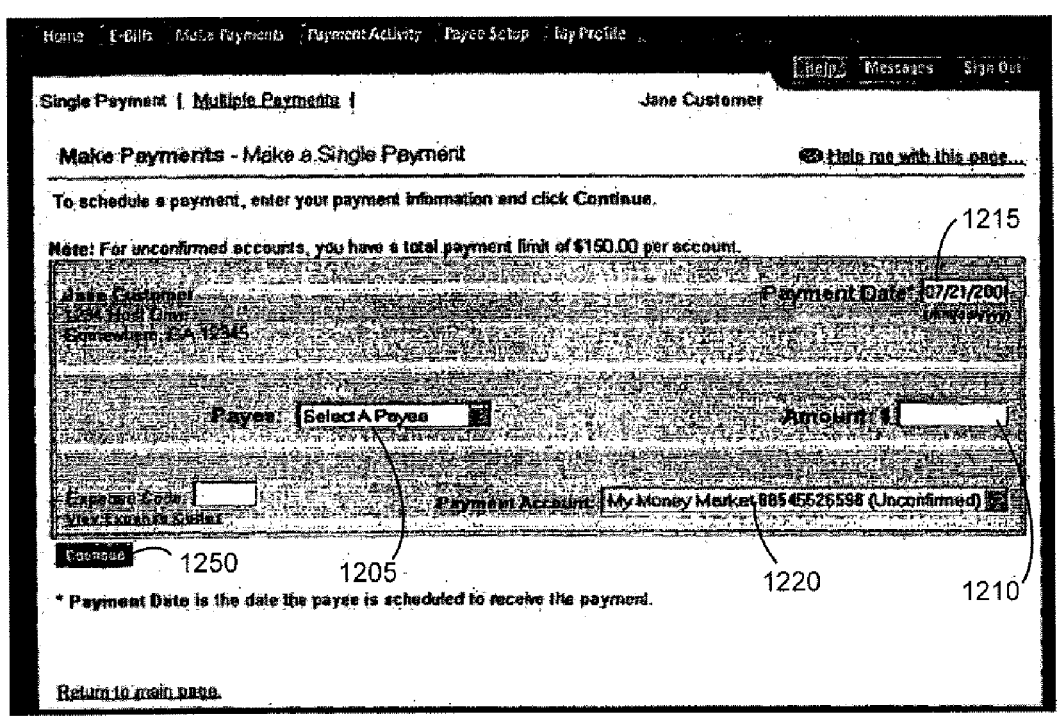
FIG. 11 is an exemplary screen shot of a Make a Single Payment page in accordance with the first embodiment and the second embodiment of the present invention.

FIG. 11 is a screen shot of an exemplary Web page 1200 hosted by the service provider 130 for a subscriber to request that a single payment be made on his or her behalf in both the first and second embodiments. This Web page, labeled as a "Make Payments-Make Single Payment" page, is a part of the unified user presentation. As shown in exemplary FIG. 11, the page includes a representation of a check with fields for the subscriber to complete. The fields include a payee field 1205, an amount field 1210, a payment date field 1215, and a payment account field 1220. Also included is a "continue" link 1250 which the subscriber actives subsequent to completing the fields.

Figure 12:
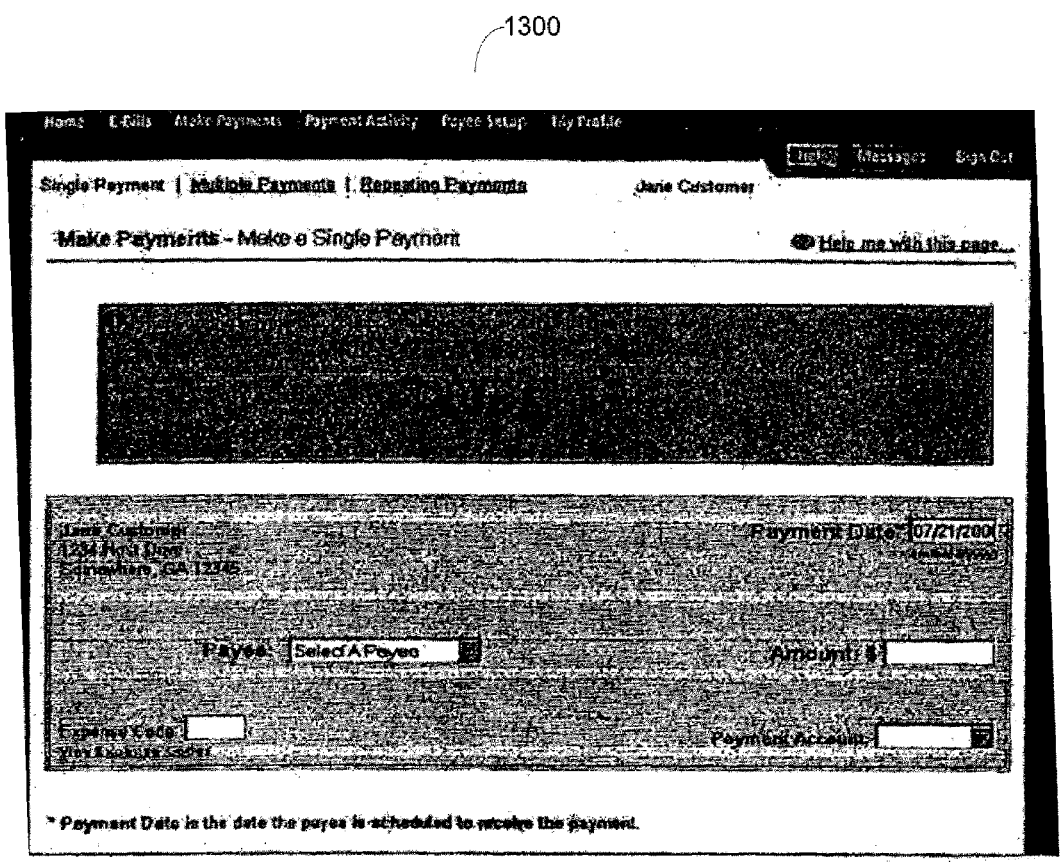
FIG. 12 is an exemplary screen shot of a Make a Single Payment page for display when a subscriber is not associated with a confirmed account in accordance with the first embodiment and the second embodiment of the present invention.

The payment account field 1220 is a pull down menu which lists each of the subscriber's confirmed and unconfirmed accounts, with an indication of each account's status as confirmed or unconfirmed. Accounts with other statuses are not included in the pull down menu. Also, unconfirmed accounts having reached a maximum monetary amount of payments could be excluded. Whenever a subscriber is presented this page, the service provider 130 accesses server memory and identifies all confirmed and unconfirmed accounts associated with that subscriber for inclusion in the payment account field 1220 pull down menu. If a subscriber is not associated with any confirmed or unconfirmed accounts, an indication of no valid accounts, discussed above, is displayed to the subscriber, as shown in exemplary FIG. 12, instead of the Web page shown in FIG. 11. The error message includes an embedded link 1305 to the "My Profile-Payment Account Information" Web page 1100, discussed above. Alternatively, the pull-down menu could be pre-populated with confirmed accounts and those unconfirmed accounts whose payment amount limits have not been reached.

In the payment date field 1215 the subscriber enters the date he or she wishes payment to be made. If a subscriber has indicated payment from an unconfirmed account, upon activation of the continue link 1250, the service provider 130 determines if the indicated date is more than 45 days from the initial submission of the account for confirmation, as discussed above. If so, an error message (not shown), is presented to the subscriber indicating that the payment date is invalid. Preferably, this indication indicates the latest future date that a payment can be scheduled.

In the payment amount field 1210 the subscriber enters the amount of the payment. If a subscriber, making payment from an unconfirmed account, enters a value in the payment amount field 1210 which is greater than the limited amount, or an amount when added to previously submitted payments from the same unconfirmed account is greater than the limited amount, the payment request will not be accepted, as discussed above. If either the requested payment amount or the requested payment amount combined with the total of previous payments from this account is greater than the limited amount, an error message (not shown) will be presented to the subscriber indicating that payment request cannot be processed. Preferably, the error message indicates the maximum payment amount which will be accepted for processing.

Payment Completed

Figure 13:
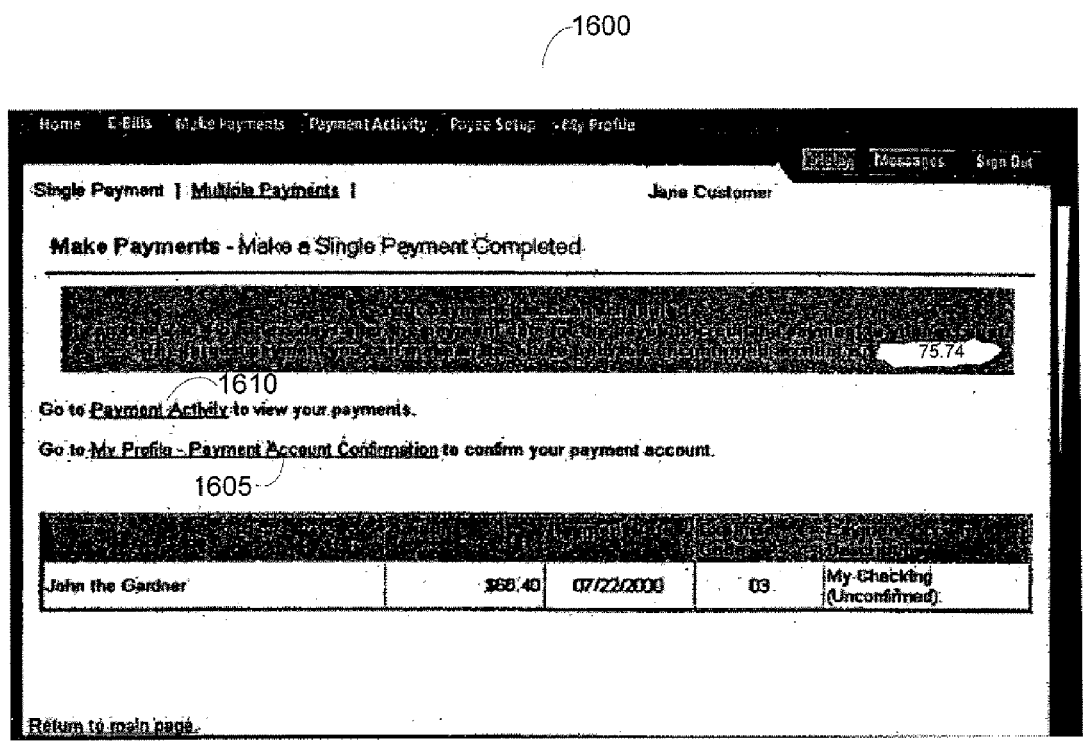
FIG. 13 is an exemplary screen shot of a Confirmation page for display when a payment request has been accepted in accordance with the first embodiment and the second embodiment of the present invention.

FIG. 13 is a screen shot of an exemplary Web page 1600 hosted by the service provider 130 for display upon a payment request, from an unconfirmed account, being accepted for payment by the service provider 130 in both the first and second embodiments. This Web page, labeled as a "Make Payments-Make a Single Payment Completed" page, is a part of the unified user presentation.

As shown in exemplary FIG. 13, the Web page includes information indicating the payee, the payment amount, and the account from which payment was requested. The Web page also can include optional information indicating the largest payment that can be made from this unconfirmed account in the future.

Each time the service provider 130 accepts a payment request for payment from an unconfirmed account, the service provider 130 stores an indication of the accepted payment in server memory, as discussed above. Whenever this Web page is displayed to the subscriber, the service provider 130 accesses server memory and determines the total amount of payments made from the unconfirmed account, subtracts this amount from the limited amount, and presents the result as a part of this page.

As shown in FIG. 13, the maximum payment this subscriber can make from this unconfirmed account is $75.74. This page also includes embedded link 1605 to a "My Profile-Payment Account Confirmation" screen, discussed above and shown in FIG. 6A and FIG. 6B, and embedded link 1610 to a "Payment Activity" Web page, discussed below.

Person-to-person payments, also known as e-mail payments, from unconfirmed accounts can also be directed by subscribers in the first and second embodiments. In e-mail payments, both the payee and the payor are subscribers and payment is requested by simply providing the payee's e-mail address and an amount to the service provider 130. However, as discussed above, a subscriber is limited in the monetary amount of e-mail payment(s) he or she can request be made from an unconfirmed account, as well as being limited in future dated e-mail payments. If a subscriber (payor) requests that an e-mail payment be made to a subscriber (payee) having no confirmed account, the service provider 130 will inform the subscriber (payor) that the payment will be completed upon the payee confirming an account.

Figure 14:
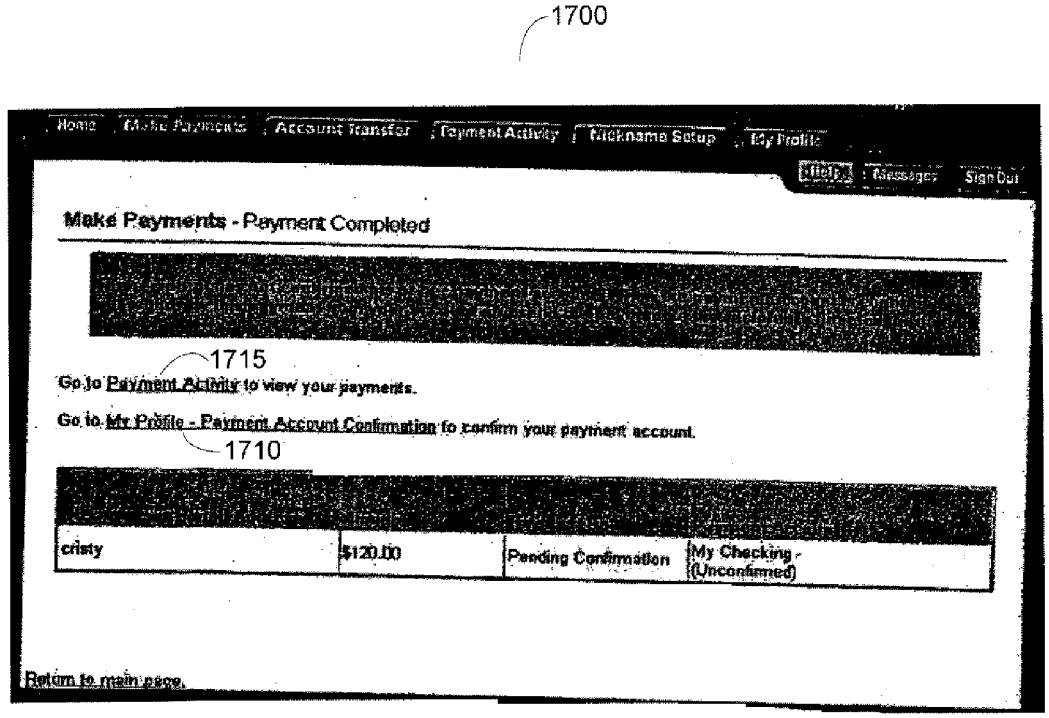
FIG. 14 is an exemplary screen shot of a person-to-person Payment Completed page for display when the payee is not associated with a confirmed account in accordance with the first embodiment and the second embodiment of the present invention.

FIG. 14 is a screen shot of an exemplary Web page 1700 hosted by the service provider 130 for informing a subscriber that a payee has no confirmed accounts. This Web page, labeled as a "Make Payments-Payment Completed" page, is a part of the unified user presentation. This page informs the subscriber (payor) that the payment will be withdrawn from the payor's account when the payee confirms an account. Also, if the payment is from an unconfirmed account, an embedded links 1710 and 1715 to the payment account confirmation screen of FIG. 6A or 6B will also be included.

Also in accordance with the first and second embodiments, the service provider 130 transfers funds between accounts belonging to a subscriber upon the subscriber's request. Funds can be transferred from an account having the status of "unconfirmed," if the requested amount, as well as the total amount of payments from the unconfirmed account, is less than the limited amount. However, funds cannot be transferred to an account having the status of "unconfirmed."

Account Transfer

Figure 15:
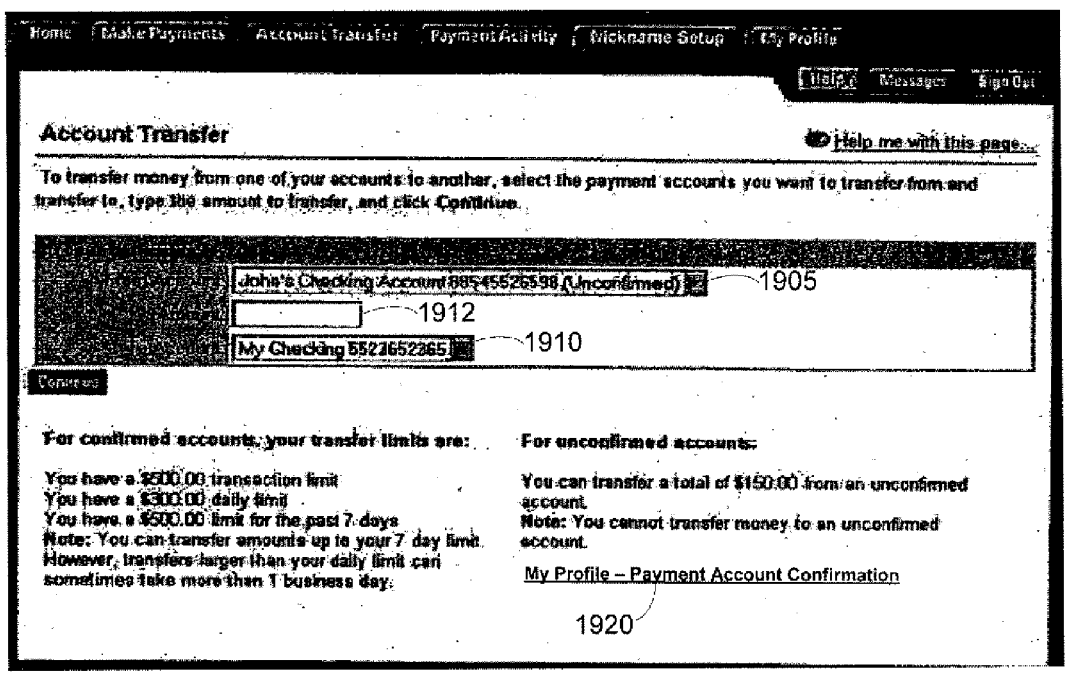
FIG. 15 is an exemplary screen shot of an Account Transfer page in accordance with the first embodiment and the second embodiment of the present invention.

FIG. 15 is a screen shot of an exemplary Web page 1900 hosted by the service provider 130 for requesting funds transfers in accordance with both the first and second embodiments. This Web page, labeled as an "Account Transfer" page, is a part of the unified user presentation. Each time this page is presented to a subscriber, the service provider 130 accesses server memory and identifies each account associated with that subscriber having the status of "confirmed" and "unconfirmed." The "Account Transfer" page 1900 includes a field to enter an account from which the transfer will be made 1905, and a field to enter an account to which the transfer will be made 1910, as well as an amount field 1912. The "from" field 1905 and the "to" field 1910 are in the form of pull-down menus. The service provider 130 pre-populates the "from" field 1905 pull-down menu with those accounts having both "unconfirmed" and "confirmed" statuses. The service provider 130 pre-populates the "to" field 1910 with those accounts having the status of "confirmed.

The "Account Transfer" page 1900 also informs the subscriber that there is a limited amount of funds which can be transferred from an unconfirmed account, as well as an indication that funds cannot be transferred to an unconfirmed account. If an unconfirmed account is associated with the subscriber, an embedded link 1920 to a payment account confirmation page is included. It should be noted that this information, concerning unconfirmed accounts, is only presented if the subscriber is associated with one or more unconfirmed accounts.

1. Introduced above, the service provider 130 presents electronic bills to subscribers. A subscriber can also request that the service provider 130 pay such bills received by the service provider 130. As should be understood from the above discussion, payment can be made from an unconfirmed account, as long as no payment amount limits, total amount of multiple payments limits, or number of payment limits, are exceeded.

Payment Request Embodiment

FIG. 16 is a simplified flow chart depicting the processing of an account confirmation technique in accordance with a third embodiment of the present invention. In this third embodiment, a subscriber validates an account by making a payment request to pay the service provider in an amount of a confirmation transaction.

As in the first and second embodiments, at step 2101, information associated with a subscriber's account is received by the service provider 130 via network(s) 100. This information includes at least a routing and transit number associated with the financial institution at which the account is maintained and an account number of the account. At step 2102 the received information is stored in memory server memory, in association with information identifying the subscriber. Also at step 2102, the date upon which the account identifying information is received in stored in memory server memory.

At step 2105 the service provider 130 generates one or more random or other monetary amounts. For example, a single amount could be generated between one cent and ninety-nine cents. However, the service provider could generate multiple amounts, each different. As above, if a random amount of zero is generated, a new random amount will typically be generated.

The service provider 130 stores an indication of each or a sum of the generated amount(s) in server memory in association with information identifying the subscriber, step 2110. If only one amount is generated, the service provider initiates an electronic credit, in the amount of the generated amount, to the subscriber's account via network 140, step 2115. If multiple amounts are generated, multiple electronic credits to the subscriber's account are initiated, each in the amount of a respective one of the generated random amounts. At step 2120 the service provider 130 stores an indication in server memory that the account is an unconfirmed account.

To validate or confirm the account, the subscriber must determine the amount(s) credited to his or her account, as discussed above. At step 2125 the service provider 130 receives a subscriber request to validate the account. This request is in the form of a request to make a payment to the service provider 130. It should be noted that in this third embodiment an unconfirmed account cannot be used to make payments to payees other than the service provider. That is, a subscriber can pay only the service provider 130 from an unconfirmed account.

At step 2128, the service provider 130 determines if the subscriber has previously attempted to confirm the account of the maximum allowed number of tries, as previously discussed. If not, operations continue with step 2130. If so, operations continue with step 2145, to be discussed further below.

At step 2130 the service provider 130 retrieves information associated with the account, including each of or the sum of the previously generated amount(s), from server memory. At step 2135 the service provider receives a payment request to pay the service provider each of or the sum of the amount(s) credited to the subscriber. If the service provider 130 credited only one amount to the subscriber's account, the request is a request to pay the service provider that amount. If multiple credits were made to the subscriber's account, the payment request could encompass multiple payment requests, each for a credited amount, or the a single payment request requesting that a single payment in the amount of the sum of the multiple credits be made to the service provider.

Upon receipt of the payment request, the service provider 130 increments the confirmation counter. At step 2137 the service provider 130 determines if the payment request requests that payment in the same amount as that credited to the subscriber's account be made. If so, the service provider debits the subscriber's account in the amount of the payment request and the subscriber has successfully validated the account, as shown in step 2148. Payment is made to an account associated with the service provider, which could be the same account from which the credit(s) was made, or a different account. At step 2149 the service provider 130 stores an indication in server memory that the subscriber's account is a confirmed account.

If the payment request to the service provider does not request that payment be made in the amount credited to the subscriber's account, operations continue with step 2128. At step 2128 the service provider 130 once again determines if the subscriber has attempted to confirm the account the maximum allowed number of times. If not, operations continue with step 2130. If so, operations continue with step 2145, in which the subscriber must enroll using an alternative enrollment method.

In a modified implementation of the third embodiment, the service provider 130 could execute a combination of debits and credits to a subscriber's account. In such a case, the total amount credited to the subscriber's account is greater than the total amount debited to the subscriber's account. To confirm the account, the subscriber requests a payment in an amount equal to the difference between the total amount credited and the total amount debited.

Figure 17:
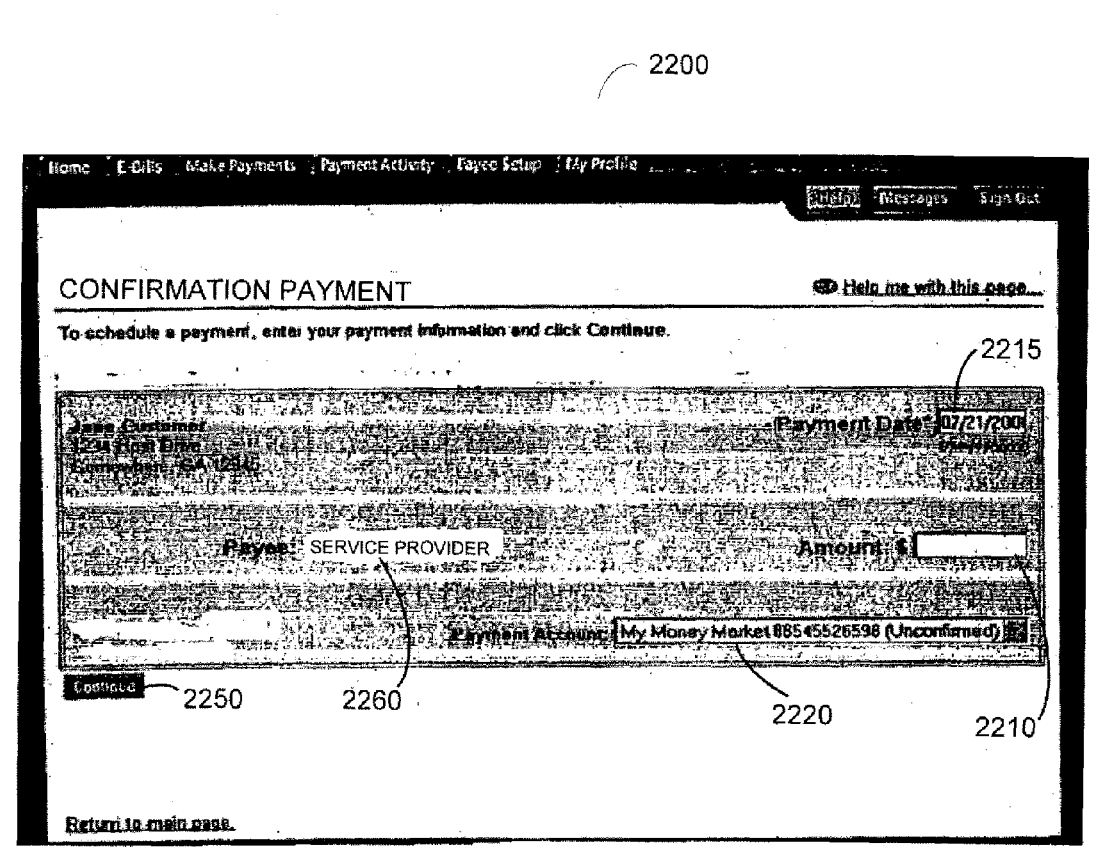

Though not depicted in FIG. 17, discussed above, if after a predetermined period of time a subscriber has not initiated a confirmation payment, or has not requested a confirmation payment in the correct amount, the service provider 130 initiates an electronic debit to the subscriber identified account. The amount of this electronic debit is the total amount of the credit(s), minus the total amount of any debit(s) made by the service provider 130 to the account.

Confirmation Payment

FIG. 17 is a screen shot of an exemplary Web page 2200 hosted by the service provider 130 for a subscriber to make a single confirmation payment in accordance with this third embodiment. The Web page, labeled as a "Confirmation Payment" page is a part of a unified user presentation though which a subscriber can direct payments and engage in other online activity involving confirmed accounts. This page is reachable from various places within the unified user presentation. For example, in a "Make Payments" page, as discussed above, if a user selects to make a payment from an unconfirmed account, this page is presented.

The exemplary "Confirmation Payment" page 2200A includes three fields for the subscriber to enter information. In field 2215 the subscriber can designate the date on which the payment will be made. In field 2220 the subscriber can select the unconfirmed account from which to make the payment. The service provider 130 preferably pre-populates a pull down menu with each unconfirmed account associated with the subscriber. In field 2210 the subscriber enters the amount of the confirmation credit (deposit) to the subscriber's account. This page does not include a field for the subscriber to enter a payee name, as this payment must be made to the service provider 130. Thus, from an unconfirmed account, the subscriber is forced to make a payment only to the service provider 130, though a subscriber also associated with one or more confirmed accounts would be permitted to make payments to any payee from a confirmed account. The presented page includes an indication 2260 that this payment will be made to the service provider 130. Selection of the Continue link 2250 causes the payment request to be transmitted to the service provider 130.

The "Confirmation Payment" page 2200 depicted in FIG. 17 can also be presented when the service provider 130 makes multiple confirmation credits to the subscriber's account. In such a situation, the subscriber would enter in the total of amount of the multiple confirmation credits in field 2210.

Figure 18:
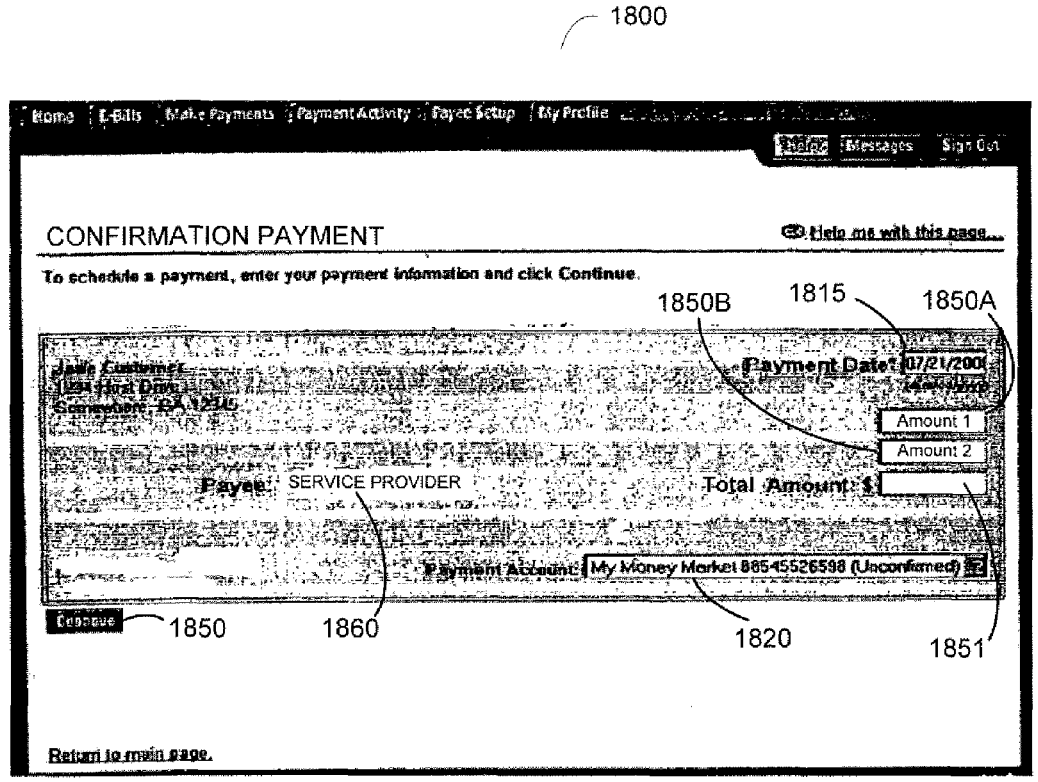
FIG. 18 is an exemplary screen shot of an alternative Confirmation Payment page in accordance with the third embodiment of the present invention.

FIG. 18 is a screen shot of an alternative exemplary Web page 1800 hosted by the service provider 130 for a subscriber to make a single confirmation payment in accordance with this third embodiment when the service provider makes multiple confirmation credits to a subscriber's account. The Web page, also labeled as a "Confirmation Payment" page is a part of a unified user presentation though which a subscriber can direct payments and engage in other online activity involving confirmed accounts. This page is reachable from various places within the unified user presentation.

The exemplary "Confirmation Payment" page 1800 includes four fields for the subscriber to enter information. In field 1815 the subscriber can designate the date on which the payment will be made. Alternatively, field 1815 can be pre-populated, such as with the current date, though this pre-populated date field would preferably be user-modifiable. In field 1820 the subscriber can select the unconfirmed account from which to make the payment. The service provider 130 preferably pre-populates a pull down menu with each unconfirmed account associated with the subscriber. FIG. 1800 reflects a case where two confirmation credits are made to a subscriber's account. In field 1850A the subscriber enters the amount of the first confirmation credit. In field 1850B the subscriber enters the amount of the second confirmation credit. If more than two confirmation credits are made to an account, the "Confirmation Payment" page 1800 would include fields for entering each of the multiple confirmation credits. The "Confirmation Payment" page 1800 also includes a field 1851 in which the amounts entered in fields 1850A and 1850B are automatically totaled. Thus, the subscriber enters in the amounts of the confirmation credits, and the total amount of these credits is displayed in field 1851.

As in the page depicted in FIG. 17, this page does not include a field for the subscriber to enter a payee name, as this payment must be made to the service provider 130. The presented page includes an indication 1860B that this payment will be made to the service provider 130. Selection of the Continue link 1850B causes the payment request to be transmitted to the service provider 130.

Random Debit/Credit Embodiment

Figure 19:
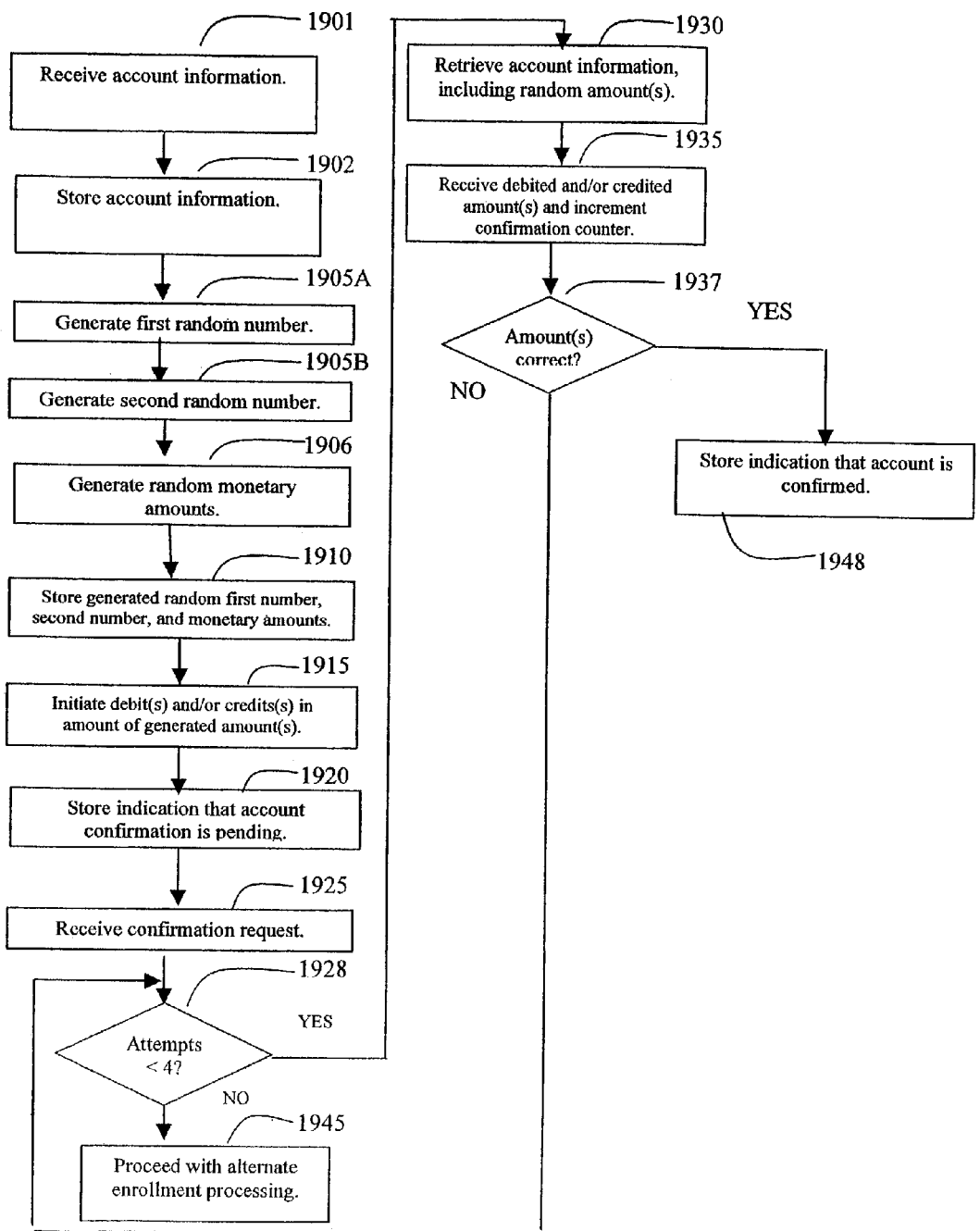
FIG. 19 is a flow chart depicting account confirmation processing in accordance with a fourth embodiment of the present invention.

FIG. 19 is a simplified flow chart depicting the processing of an account confirmation technique in accordance with yet a fourth embodiment of the present invention. As shown at step 1901, information associated with a subscriber's account is received by the service provider 130 via network(s) 100. This information includes at least a routing and transit number associated with the financial institution at which the account is maintained and an account number of the account. As in the above embodiments, the account could be a checking account, a savings account, a money market account, a line of credit, or any other type account maintained at a financial institution. At step 1902 the received information is stored in server memory, in association with information identifying the subscriber. Also at step 1902, the date upon which the account identifying information is received in stored in server memory.

At step 1905A the service provider 130 generates a first random number, preferably between one and six, though the generated first random number could be one, or could include numbers greater than five. However, the first generated random number will not be zero. At step 1905B the service provider 130 generates a second random number which is equal to or less than the generated first random number. The generated second random number can be zero.

At step 1906, the service provider 130 then generates a number of random monetary amounts, preferably between one cent and ninety-nine cents each for subscribers whose accounts are located in the United States of America, the same as the first generated random number. For example, if the first generated random number is four, four random amounts are generated. Each of the generated random amounts should be different. Thus, if a duplicate random amount is generated, another random amount is generated different than the duplicate random amount. It should be noted that in this embodiment, as well as others described herein, if a subscriber's financial institution is located in a country other than the country in which the service provider is located, the generated random amount(s) could be expressed in any currency, and debits and/or credits could be initiated in any currency, as long as some type of currency conversion is performed prior to debiting and/or crediting a subscriber's account. That is, a subscriber's account will normally be debited or credited in the currency maintained in that account, though the service provider can initiate debits and/or credits expressed in a currency different that the currency of the subscriber's account.

The service provider 130 stores an indication of the generated first random number, second random number, and random amounts and/or a sum thereof, in server memory in association with the information identifying the subscriber and the appropriate account, step 1910.

In this fourth embodiment, the generated second random number indicates a number of electronic credits to a subscriber's account be initiated by the service provider 130. The absolute difference, if any, between the generated first and second random numbers is the number of electronic debits from a subscriber's account to be initiated by the service provider. Thus, if the generated first random number is four and the generated second random number is one, one electronic credit and three electronic debits will be initiated by the service provider 130. However, it should be understood that the generated second random number could indicate a number of electronic debits from a subscriber's account to be initiated by the service provider 130, and the absolute difference, if any, between the generated first and second random numbers is the number of electronic credits to the subscriber's account to be initiated by the service provider.

At step 1915 the service provider 130 initiates the confirmation transactions (i.e., electronic credits(s) and/or debit(s)). The following table shows possible combinations of confirmation transactions when the generated first random number is between zero and four.

TABLE ONE

| Generated First Random Number | Generated Second Random Number | Number of Electronic Credits | Number of Electronic Debits |
|---|---|---|---|
| 3 | 3 | 3 | 0 |
| 3 | 2 | 2 | 1 |
| 3 | 1 | 1 | 2 |
| 3 | 0 | 0 | 3 |
| 2 | 2 | 2 | 0 |
| 2 | 1 | 1 | 1 |
| 2 | 0 | 0 | 2 |
| 1 | 1 | 1 | 0 |
| 1 | 0 | 0 | 1 |

Of course, if the generated second random number specifies the number of electronic debits, the entries in the third and fourth columns would be switched.

The service provider 130 first initiates any electronic credits, and then initiates any electronic debits, with the generated first random amount initiated first, and so on. For example, and with reference to the table, if the generated first random number is three, and the generated second random number is one, the service provider 130 would generate three random amounts. In this example, the first initiated confirmation transaction would be an electronic credit to the subscriber's account in the amount of the generated first random amount, the second initiated confirmation transaction would be an electronic debit from the subscriber's account in the amount of the generated second random amount, and the third confirmation transaction would be an electronic debit from the subscriber's account in the amount of the generated third random amount.

To confirm the account, the subscriber must determine the amount(s) of the confirmation transactions (i.e., credit(s) and/or debit(s)), as discussed above. At step 1925 the service provider 130 receives a subscriber's request to confirm the account.

At step 1928 the service provider 130 determines if the subscriber has previously attempted to confirm the account less than some predetermined number of times, in this embodiment, preferably four times. To do so, the service provider 130 accesses the confirmation counter, as discussed above, and determines if its value is three or less. If so, operations continue with step 1930. If not, operations continue with step 1945.

At step 1930 the service provider 130 retrieves information associated with the account, including the previously generated random numbers and random amounts, or a sum thereof, from server memory. The service provider 130, as shown in step 1935, also receives, from the subscriber, information identifying the credited and/or debited amount(s), or the sum of the credits and/or sum of the debits, or the sum of both the credits and debits, including whether the, or each, amount is a debited or a credited amount, or a sum thereof. Upon receipt of this information, the service provider 130 increments the confirmation counter.

At step 1937, the service provider 130 determines if the received information does in fact represent the credited and/or debited amount(s). If so, the subscriber has successfully confirmed the account, and the service provider 130 stores an indication in server memory that the account is a confirmed account, step 1948. If not, operations continue with step 1928.

At step 1928 the service provider 130 once again determines if the subscriber has attempted to confirm the account less than three times. If so, operations continue with step 1930. If not, operations continue with step 1945, in which the subscriber must enroll using an alternative enrollment method.

In this fourth embodiment, the number of credits and/or debits, as well as their amounts, are random. Thus, the total amount debited during confirmation may be greater than the total amount credited, or vice-versa. If a subscriber does not successfully confirm the account within a predetermined period, the service provider 130 initiates a reversal transaction which will place the subscriber's account in a zero-balance position with respect to the service provider 130. Thus, if a total amount of debited from the subscriber's account exceeds a total amount credited to the subscriber's account, the service provider 130 will initiate an electronic credit to the subscriber's account in an amount equal to the difference between the amount debited and the amount credited. Likewise, if a total amount of credited to the subscriber's account exceeds a total amount debited from the subscriber's account, the service provider 130 will initiate an electronic debit from the subscriber's account in an amount equal to the difference between the amount credited and the amount debited. This same process can be used to balance an account in other embodiments described above.

Upon successful confirmation of an account in this fourth embodiment, if a total amount credited to a subscriber's account is greater than a total amount debited from the subscriber's account, the service provider preferably initiates an electronic debit from the subscriber's account in the amount of the difference between the total amount credited and the total amount debited. And, if upon successful confirmation of an account in this fourth embodiment, if a total amount debited from a subscriber's account is greater than a total amount credited to the subscriber's account, the service provider can either retain this difference, perhaps applying it to any fees incurred by the subscriber, or the service provider 130 can initiate an electronic credit to the subscriber's account in the amount of the difference between the total amount debited and the total amount credited. It should be understood that the above described randomizing algorithm may also be utilized in the other described embodiments of the invention.

The present invention is not to be limited in scope by the specific embodiments described herein. Indeed, various modifications of the present invention in addition to those described herein, will be apparent to those of skill in the art from the foregoing description and accompanying drawings. Thus, such modifications are intended to fall within the scope of the appended claims.

We claim:

1. A method, comprising:
   receiving, by a service provider system comprising one or more computers, identification of a payment account to be used in fulfilling payment requests submitted by a subscriber to a service provider;
   responsive to receiving the identification of the payment account, confirming, by the service provider system, a legitimate association of the payment account with the subscriber;
   upon confirming the legitimate association of the payment account with the subscriber, storing, by the service provider system, an indication that the payment account is confirmed as a confirmed account for use in funding future payment requests from the subscriber; and
   prior to storing the indication that the payment account is confirmed as a confirmed account:
   receiving, by the service provider system, a payment request on behalf of the subscriber specifying the payment account as the source of funds, the payment account being unconfirmed prior to storing the indication that the payment account is confirmed, determining, by the service provider system, that the unconfirmed payment account is not indicated as a confirmed account, in response to determining that the unconfirmed payment account is not indicated as a confirmed account, determining, by the service provider system, that the payment request complies with at least one pre-acceptance transaction rule, wherein each of the at least one pre-acceptance transaction rule specifies at least one respective criterion for allowing payment request processing utilizing the unconfirmed payment account prior to storing the indication that the unconfirmed payment account is confirmed for use in funding future payment requests from the subscriber, and directing, by the service provider system, payment from the unconfirmed account in accordance with the payment request after determining that the payment request complies with the at least one pre-acceptance transaction rule.

2. The method of claim 1, wherein the payment request includes a transaction date and a transaction amount;

wherein the at least one pre-acceptance transaction rule includes at least one of: a pre-confirmation date indicating a date beyond which the payment request cannot be processed, and a pre-confirmation amount indicating an amount which, if exceeded, the payment request cannot be processed; and wherein determining that the payment request complies with at least one pre-acceptance transaction rule includes determining that the payment request complies with at least one pre-acceptance transaction rule when the transaction date is earlier than the pre-confirmation date or when the transaction amount does not exceed the pre-confirmation amount.

3. The method of claim 1, wherein the payment account is one of (i) a checking account, (ii) a savings account, (iii) a money market account, or (iv) a line of credit.

4. The method of claim 1, further comprising:

storing a plurality of different pre-acceptance transaction rules; and prior to determining that the payment request complies with the at least one pre-acceptance transaction rule, selecting the at least one pre-acceptance transaction rule from the stored plurality of different pre-acceptance transaction rules.

5. The method of claim 4, wherein the at least one pre-acceptance transaction rule is selected based on the subscriber or a sponsor of the subscriber.

6. The method of claim 1, wherein the payment account is with a financial institution separate from the service provider.

7. The method of claim 1, wherein receiving the identification of the payment account occurs over a first network and confirming the legitimate association of the payment account with the subscriber occurs over a second network.

8. A system comprising:

a storage device, wherein the storage device includes at least one pre-acceptance transaction rule; and a processor, in communication with the storage device, wherein the processor is configured to execute software instructions to:

receive, from a subscriber, identification of a payment account to be used in fulfilling payment requests submitted by a subscriber to a service provider;

responsive to receiving the identification of the payment account, confirm a legitimate association of the payment account with the subscriber;

upon confirming the legitimate association of the payment account with the subscriber, storing an indication that the payment account is confirmed as a confirmed account for use in funding future payment requests from the subscriber; and prior to storing the indication that the payment account is confirmed as a confirmed account:

receive a payment request on behalf of the subscriber specifying the payment account as the source of funds, the payment account being unconfirmed prior to storing the indication that the payment account is confirmed, determining, by the service provider system, that the unconfirmed payment account is not indicated as a confirmed account, in response to determining that the unconfirmed payment account is not indicated as a confirmed account, determine that the payment request complies with the at least one pre-acceptance transaction rule, wherein each of the at least one pre-acceptance transaction rule specifies at least one respective criterion for allowing payment request processing utilizing the unconfirmed payment account prior to storing the indication that the unconfirmed payment account is confirmed for use in funding future payment requests from the subscriber, and direct payment from the unconfirmed account in accordance with the payment request after determining that the payment request complies with the at least one pre-acceptance transaction rule.

9. The system of claim 8, wherein the payment request includes a transaction date and a transaction amount;

wherein the at least one pre-acceptance transaction rule includes at least one of: a pre-confirmation date indicating a date beyond which the payment request cannot be processed, and a pre-confirmation amount indicating an amount which, if exceeded, the payment request cannot be processed; and wherein determining that the payment request complies with at least one pre-acceptance transaction rule includes determining that the payment request complies with at least one pre-acceptance transaction rule when the transaction date is earlier than the pre-confirmation date or when the transaction amount does not exceed the pre-confirmation amount.

10. The system of claim 8, wherein the payment account is one of (i) a checking account, (ii) a savings account, (iii) a money market account, or (iv) a line of credit.

11. The system of claim 8, wherein the processor is configured to execute additional software instructions to:

store a plurality of different pre-acceptance transaction rules; and prior to determining that the payment request complies with the at least one pre-acceptance transaction rule, select the at least one pre-acceptance transaction rule from the stored plurality of different pre-acceptance transaction rules.

12. The system of claim 11, wherein the at least one pre-acceptance transaction rule is selected based on the subscriber or a sponsor of the subscriber.

13. The system of claim 8, wherein the payment account is with a financial institution separate from the service provider.

14. The system of claim 8, wherein receiving the identification of the payment account occurs over a first network and confirming the legitimate association of the payment account with the subscriber occurs over a second network.

15. A system, comprising:
   means for receiving, from a subscriber, identification of a payment account to be used in fulfilling payment requests submitted by a subscriber to the service provider;
   means for, responsive to receiving the identification of the payment account, confirming a legitimate association of the payment account with the subscriber;
   means for storing an indication that the payment account is confirmed as a confirmed account for use in funding future payment requests from the subscriber upon confirming the legitimate association of the payment account with the subscriber; and
   means for prior to storing the indication that the payment account is confirmed as a confirmed account:
      receiving a payment request on behalf of the subscriber specifying the payment account as the source of funds, the payment account being unconfirmed prior to storing the indication that the payment account is confirmed,
      determining, by the service provider system, that the unconfirmed payment account is not indicated as a confirmed account,
      in response to determining that the unconfirmed payment account is not indicated as a confirmed account, determining that the payment request complies with at least one pre-acceptance transaction rule, wherein each of the at least one pre-acceptance transaction rule specifies at least one respective criterion for allowing payment request processing prior to storing the indication that the unconfirmed payment account is confirmed for use in funding future payment requests from the subscriber, and
      directing payment from the unconfirmed account in accordance with the payment request after determining that the payment request complies with the at least one pre-acceptance transaction rule.

16. The method of claim 1, wherein the payment request is a first payment request, and further comprising:
   prior to completing the confirmation of the legitimate association of the payment account with the subscriber:
      receiving, at the service provider, a second payment request on behalf of the subscriber specifying the payment account as the source of funds,
      determining, at the service provider, that the second payment request does not comply with at least one pre-acceptance transaction rule, and
      transmitting, from the service provider, a message to the subscriber informing the subscriber the second payment request is not valid.

17. The method of claim 16, further comprising:
   after completing the confirmation of the legitimate association of the payment account with the subscriber:
   receiving a third payment request, wherein the third payment request is a re-submission of the second payment request, and
   directing payment in accordance with the third payment request.

18. The system of claim 8, wherein the payment request is a first payment request, and wherein the processor is configured to execute additional software instructions to:
   prior to completing the confirmation of the legitimate association of the payment account with the subscriber:
      receive a second payment request on behalf of the subscriber specifying the payment account as the source of funds,
      determine that the second payment request does not comply with at least one pre-acceptance transaction rule, and
      transmit a message to the subscriber informing the subscriber the second payment request is not valid.

19. The system of claim 18, wherein the processor is configured to execute additional software instructions to:
   after confirming the legitimate association of the payment account with the subscriber:
      receive a third payment request, wherein the third payment request is a re-submission of the second payment request, and
      directing payment in accordance with the third payment request.

20. The method of claim 1, wherein confirming the legitimate association of the payment account with the subscriber includes the service provider initiating at least one debit or credit transaction against the payment account and subsequently receiving transaction information from the subscriber, and wherein the transaction information includes or is associated with an attribute of the at least one debit or credit transaction.

21. The method of claim 20, wherein the service provider initiating at least one debit or credit transaction against the payment account includes initiating at least one debit transaction and at least one credit transaction against the payment account, wherein each debit or credit transaction has an amount, and wherein the sum of the amounts of the at least one credit transaction offsets the sum of the amounts of the at least one debit transaction.

22. The method of claim 20, wherein the service provider initiating at least one debit or credit transaction against the payment account includes initiating at least one debit or credit transaction against the payment account, wherein the number of the debit or credit transactions initiated is determined by generating at least one random number.

23. The system of claim 8, wherein the software instructions for the processor confirming the legitimate association of the payment account with the subscriber includes initiating at least one debit or credit transaction against the payment account and subsequently receiving transaction information from the subscriber, and wherein the transaction information includes or is associated with an attribute of the at least one debit or credit transaction.

24. The system of claim 23, wherein the software instructions for the processor initiating at least one debit or credit transaction against the payment account includes initiating at least one debit transaction and at least one credit transaction against the payment account, wherein each debit or credit transaction has an amount, and wherein the sum of the amounts of the at least one credit transaction offsets the sum of the amounts of the at least one debit transaction.

25. The system of claim 23, wherein the software instructions for the processor initiating at least one debit or credit transaction against the payment account includes initiating at least one debit or credit transaction against the payment account, wherein the number of the debit or credit transactions initiated is determined by generating at least one random number.

* * * * *